(12) United States Patent
Chava

(10) Patent No.: US 8,977,234 B2
(45) Date of Patent: Mar. 10, 2015

(54) USING LOW-COST TAGS TO FACILITATE MOBILE TRANSACTIONS

(71) Applicant: AirArts, Inc., Reston, VA (US)

(72) Inventor: Ven Chava, Herndon, VA (US)

(73) Assignee: AirArts, Inc., Reston, VA (US)

( * ) Notice: Subject to any disclaimer, the term of this patent is extended or adjusted under 35 U.S.C. 154(b) by 0 days.

(21) Appl. No.: 14/281,250

(22) Filed: May 19, 2014

(65) Prior Publication Data

US 2014/0258127 A1  Sep. 11, 2014

Related U.S. Application Data

(60) Continuation-in-part of application No. 13/541,124, filed on Jul. 3, 2012, now Pat. No. 8,787,969, which is a division of application No. 12/555,268, filed on Sep. 8, 2009, now Pat. No. 8,238,828, which is a continuation-in-part of application No. 12/078,978, filed on Apr. 9, 2008, now Pat. No. 8,532,624.

(51) Int. Cl.
*H04M 1/66* (2006.01)
*G06Q 20/32* (2012.01)
*H04Q 9/00* (2006.01)

(52) U.S. Cl.
CPC ........ *G06Q 20/3278* (2013.01); *G06Q 20/3276* (2013.01); *H04Q 2209/47* (2013.01); *H04Q 9/00* (2013.01); *H04Q 2213/13095* (2013.01)

USPC ...... 455/410; 455/550.1; 455/41.1; 455/41.2; 455/41.3; 705/14.64; 705/14.65; 705/17; 705/18; 705/19; 340/571; 340/572.1; 340/12.5; 340/12.51; 340/13.24

(58) Field of Classification Search
USPC .......... 455/410, 550.1, 41.1–41.3; 705/14.64, 705/14.65, 17, 18, 20, 21, 26.35, 26.8, 705/26.81, 400, 401, 408, 410, 75, 76–79, 705/55–56; 340/571, 572.1, 12.5, 12.51, 340/13.24, 13.25, 13.26, 854.6, 854.8
See application file for complete search history.

(56) References Cited

U.S. PATENT DOCUMENTS

| | | | | |
|---|---|---|---|---|
| 7,721,957 B2 * | 5/2010 | Babine et al. | ................. | 235/380 |
| 2005/0027543 A1 * | 2/2005 | Labrou et al. | ..................... | 705/1 |
| 2009/0114712 A1 * | 5/2009 | Babine et al. | ................. | 235/375 |

* cited by examiner

*Primary Examiner* — Fayyaz Alam
(74) *Attorney, Agent, or Firm* — Andrew Rush; PCT Law Group, PLLC

(57) ABSTRACT

Systems, methods and computer program products for facilitating payments using low-cost barcode or RFID tags are disclosed. Such tags can be attached or affixed to physical, real-world objects thus allowing the objects to be purchased using a customer mobile device, without the need for a dedicated, on-site point-of-sale system. The tags may be constructed from paper, metal, leather, plastic or some other low-cost material. The tag allows a unique visual identifier such as a tag code to be imprinted so that it can be read using a mobile camera or other sensor enabled telephone.

10 Claims, 21 Drawing Sheets

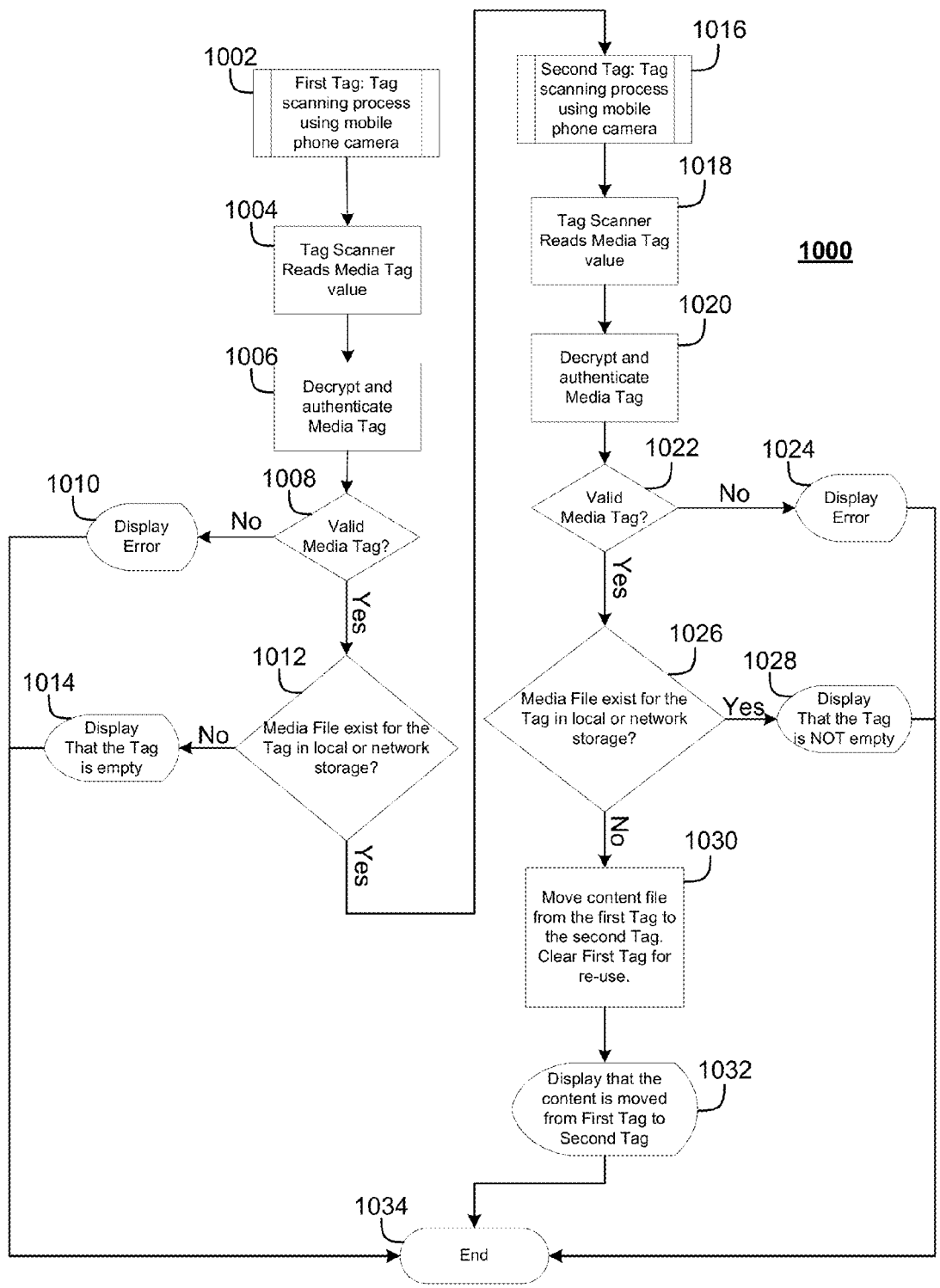
FIG. 10-A

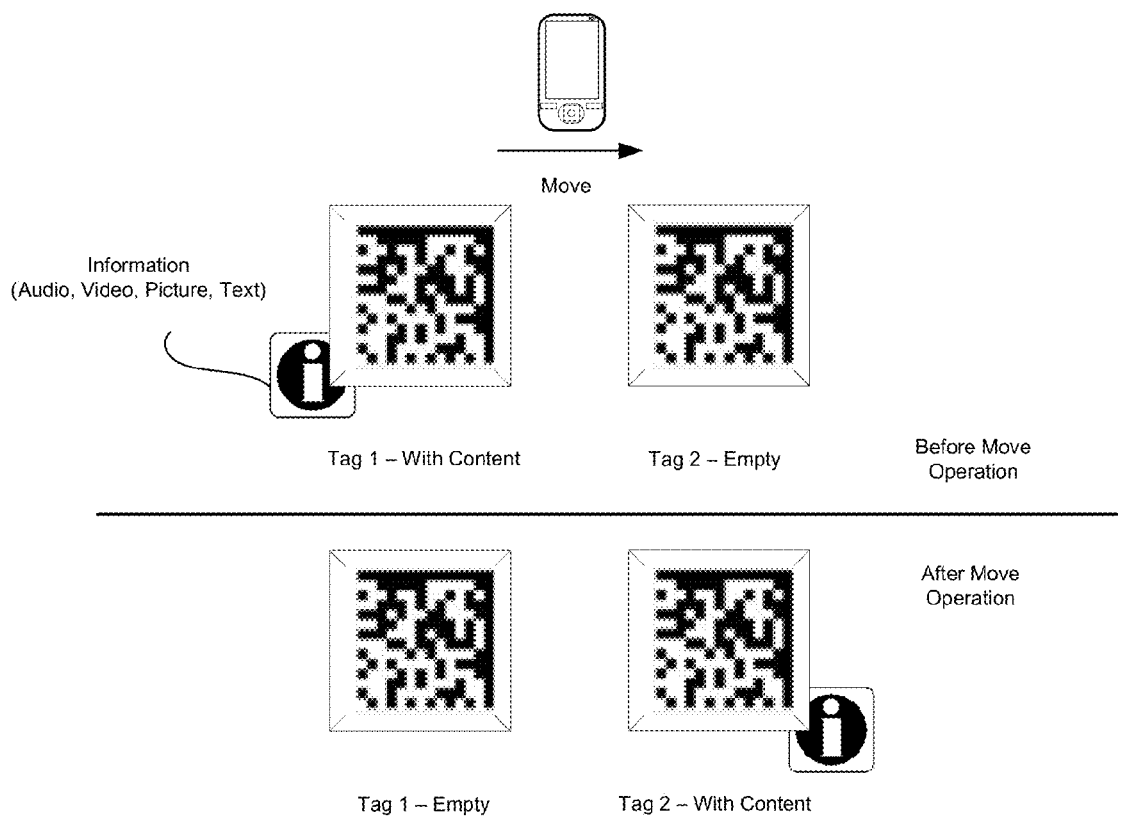
FIG. 10-B

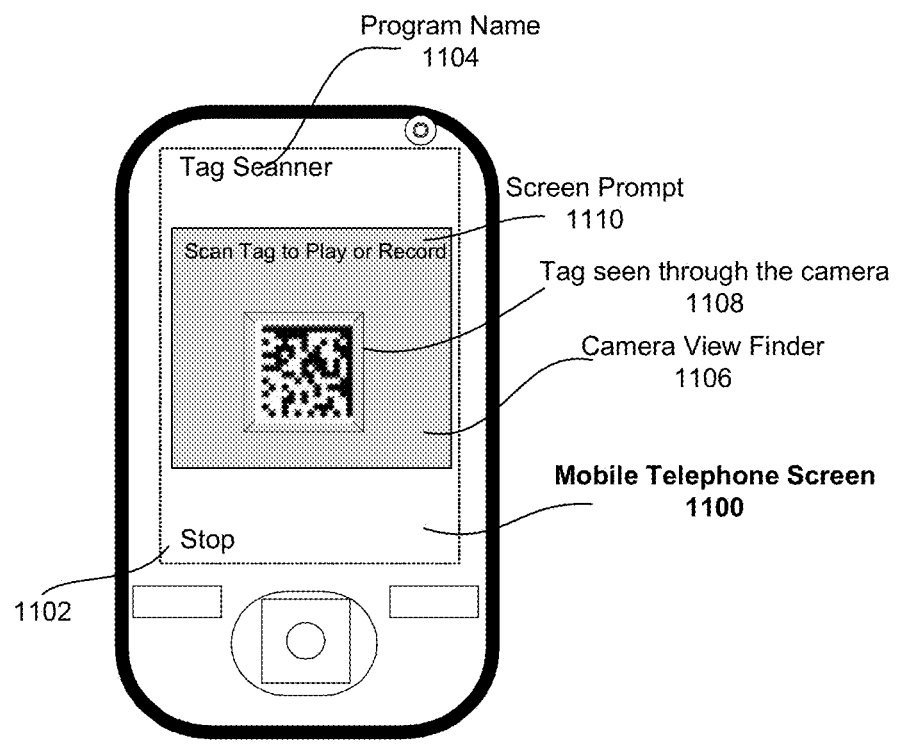
Fig. 11-A
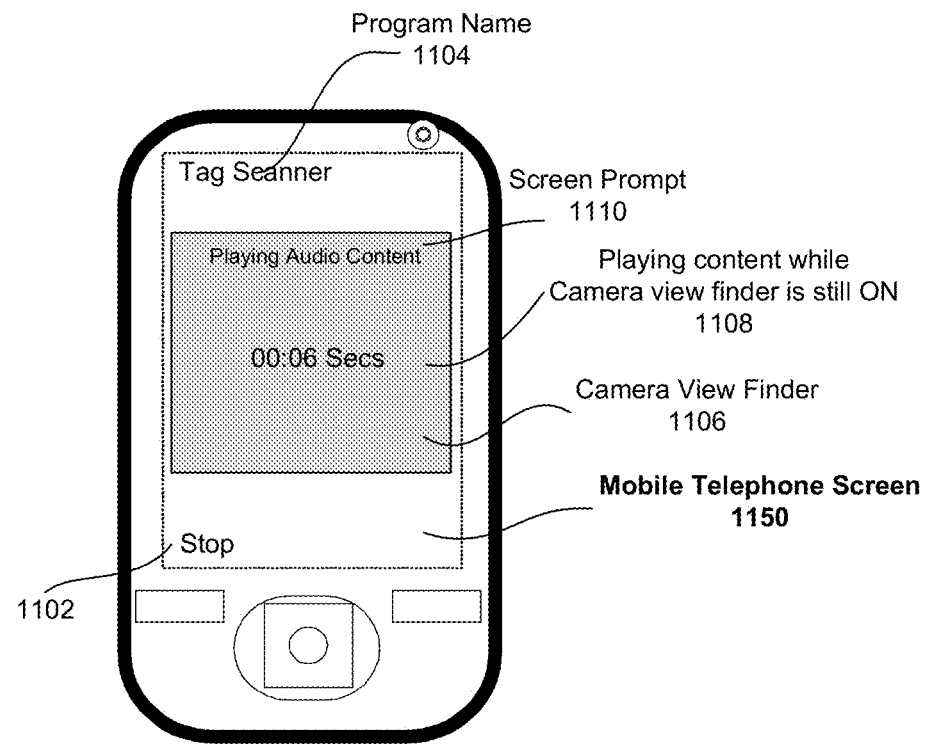
Fig. 11-B

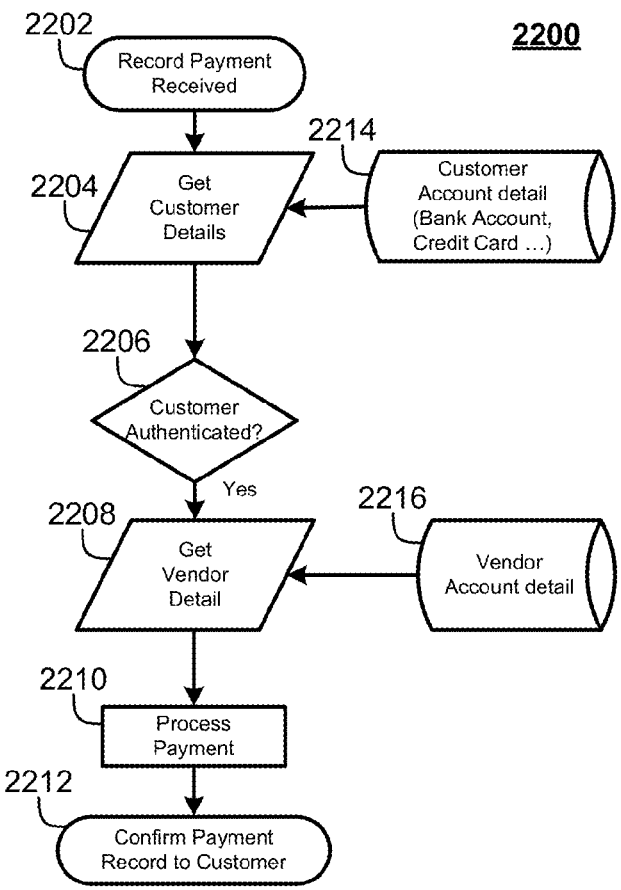
FIG. 22
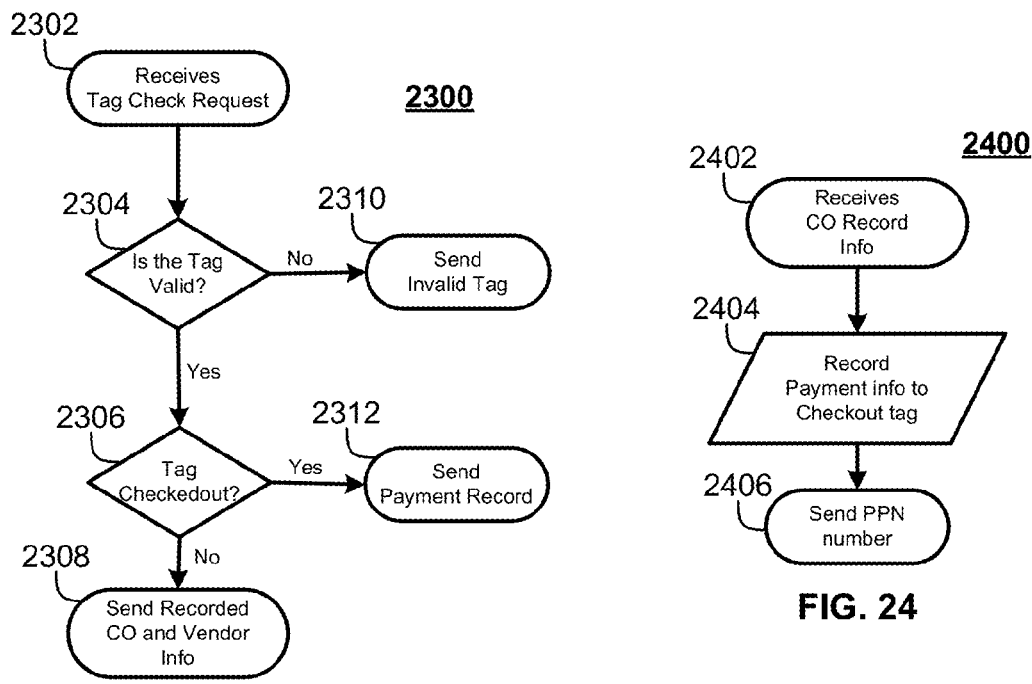
FIG. 23
FIG. 24

USING LOW-COST TAGS TO FACILITATE MOBILE TRANSACTIONS

CROSS-REFERENCE TO RELATED APPLICATIONS

This application claims the benefit, and is a continuation-in-part of Applicant's U.S. patent application Ser. No. 13/541,124 titled "Using Low-Cost Tags as a Virtual Storage Medium For Multimedia Information," filed Jul. 3, 2012; which is a divisional of Applicant's U.S. patent application Ser. No. 12/555,268 titled, "System and Method for Multimedia Storing and Retrieval Using Low-Cost Tags as Virtual Storage Mediums," filed on Sep. 8, 2009, now U.S. Pat. No. 8,238,828; which was a continuation-in-part of U.S. patent application Ser. No. 12/078,978 titled, "System and Method for Storing and Retrieving Multimedia Messages On Low-Cost Tags in Order to Facilitate Contextual Communications," filed on Apr. 9, 2008, now U.S. Pat. No. 8,532,624; each of which is incorporated by reference herein in its entirety.

BACKGROUND OF THE INVENTION

1. Field of the Invention

The present invention generally relates to systems, methods and computer programs for mobile payment transactions low-cost barcode or radio frequency identification (RFID) tags.

2. Related Art

In today's technological environment, electronic communications mechanisms can be classified as either Person-to-Person (P2P), Unidirectional, Annotated, Social, Bulletin Board or Machine-to-Machine (M2M) communications. This classification system is based on the type of participants in the communications and usage patterns.

The above-described mechanisms of electronic communications, while they allow for rapid on-line/electronic communications, all have one deficiency. That deficiency is that they do not allow themselves to be associated with a physical (i.e., real world, non-virtual) context. For example, it would be very valuable to attach a voice message to a (tangible) gift, whereby the recipient of the gift can then easily retrieve the message when receiving the gift. Current mechanisms of sending messages with a gift include a printed or written communication in the form of a short note or a greeting card. There is no "electronic" way to "attach" a message or transaction or information about an associated transaction with the physical context. While certain "clumsy" mechanisms can be thought of—such as sending an audio tape or player with the gift or writing a note containing a URL where an electronic message may be downloaded—there is no simple and elegant way to exchange rich electronic messages that can be tied to physical world contexts.

The above example points to a need for contextual communications where electronic messages and associated transactions or other data can be attached or affixed to physical, real-world objects. Thus, Applicants' U.S. Pat. No. 8,532,624 titled, "System And Method For Storing And Retrieving Multimedia Messages On Low-Cost Tags In Order To Facilitate Contextual Communications," filed on Apr. 9, 2008 (the "624 patent"), Applicants' U.S. Pat. No. 8,238,828 titled, "System and Method for Multimedia Storing and Retrieval Using Low-Cost Tags as Virtual Storage Mediums," filed on Sep. 8, 2009, and Applicants' U.S. patent application Ser. No. 13/541,124 titled "Using Low-Cost Tags as a Virtual Storage Medium For Multimedia Information," filed Jul. 3, 2012, each now incorporated by reference herein in its entirety, disclosed systems, method and computer program products for the storing and retrieving of multimedia messages on low-cost tags, such as barcode and RFID tags, thereby facilitating contextual communications where such messages can be attached to physical, real-world objects.

The system disclosed in, for example, the '624 patent, with its Universally Unique Identifier—(UUID) based identifier printed on the tags, relies on a communications network to resolve what needs to be done when a tag is scanned by a mobile telephone equipped with appropriate software and sensors for reading and writing messages onto the tags. This implies having a relationship between the end user and the service provider of the contextual messaging software and, a priori, information about the application, UUID-based tag identifiers and configuration of meta data information and relationship between them on the network.

Current retail transactions are largely closed loop relying on expensive point of sale (POS) systems. Payment within retailers are typically carried out via cash, credit or debit cards. Products are labeled with barcodes or other machine readable labels understandable by proprietary POS readers. Because many retailers are selective about the types of payments they accept and there is an ever increasing number of payment processors (including, but not limited to PayPal, Visa, Mastercard, American Express, retailer-specific accounts, and the like), consumers are forced to carry several cards within their physical wallet. Despite built-in protections, the payments industry is besieged with several security issues including stolen card numbers, theft and fraud.

In addition to the above issues, retailers and, more broadly, the payments industry at large faces a plethora of concerns related to ease of use, flexibility, security and alternative payments types. From a security perspective, most of the existing systems transmit credit and debit card transactions through merchant networks. The safety of merchant premises and networks is becoming a significant concern, as demonstrated in certain high profile retail card data theft in United States. Mobile and portable (away from POS such as restaurant tables) often require cards to be carried by a service agent which is prone to security risks.

Flexibility is difficult because point of sale systems are often expensive, proprietary and difficult to modify to accept new payment mechanisms such as NFC based payments. This is a widespread issue because virtually any vendor that desires to accept non-cash payments must have a point of sale system or software with card readers and printers. Many recent advances in QR code based mobile payments still require POS integration and ability to read QR codes from one display screen. These require expensive changes to POS systems and not very user friendly.

Emerging forms of payments such as micro transactions that deal with small purchase amounts are expensive to be handled through traditional credit card transactions.

Current self-checkout systems are not easy for consumers to use due to proprietary nature of the barcoded information and inability to easily identify and match payments to individual products.

Given the foregoing, what are now needed are methods and computer program products for using low-cost barcode or RFID tags to facilitate purchasing transactions, without requiring an expensive POS system.

BRIEF DESCRIPTION OF THE INVENTION

The present invention meets the above-identified needs by providing methods, and computer program products for using low-cost barcode or RFID tags to facilitate purchasing transactions, without requiring an expensive POS system. Aspects of the present invention utilize pre-printed and recordable tags (e.g., paper tags) and buyer mobile devices to facilitate payments. Aspects of the present invention remove the need for traditional POS systems and utilized trusted service providers to complete checkout and payment transactions.

In one aspect of the present invention, two components are provided to allow for storing, securing, identifying, authenticating and retrieving multimedia messages: (1) a low-cost, bar-coded paper tag (such as a label used for printing barcodes) is utilized as a payment tag; and (2) a software application or webpage capable of being stored, executed and/or accessed on a mobile telephone, that is used for recording tag information and providing payment authorization from a buyer—referred to herein as a "tag scanner application" and/or a "mobile payment application."

In alternate aspects, the tags may be constructed from paper, metal, leather, plastic or some other low-cost material. In all aspects, the tag allows a unique visual identifier such as a tag code to be imprinted (e.g., a Post-It® note encoded with a tag code) so that it can be read using a mobile camera or other sensor enabled telephone (e.g., the camera on a Nokia N95 Smartphone).

An advantage of aspects of the present invention is that the security of card handling is improved as merchant never sees customer's credit or debit card numbers. Credit or debit card transaction is carried out by a trusted payment service provider and vendor's bank is simply credited with the transactions.

In some aspects, sellers need not own proprietary POS systems. There is no need for any point of sale machine, card reader or printer as a vendor can simply give a hand written bill with a checkout tag to paying customer and consumer can simply make payment with their mobile phone. The checkout tag acts as a proof of payment and receipt.

Yet another advantage of aspects of the present invention is that a consumer can use any application to make the payment as long as the application with access to the mobile wallet integrated with a tag scanner and vendor lookup database as disclosed herein. This allows for many different types of payments from consumer side. Furthermore, the consumer may use their trusted payment service provider application to make the payments. In this manner, sensitive card information is not transmitted through a multitude of retail networks, thereby enhancing security.

Aspects of the present invention facilitate self-checkout because each payment tag is unique. Tags are associated with products available for purchase by, for example, affixing the tag to the specific product. This provides an advantage over current systems because traditional barcode are not unique to the individual product available for sale. On the seller side, the seller can monitor sales via accessing associated databases and/or tag service provider portals. Sellers may also track sales through the use of proof of payment number pre-printed on the vendor portion of the tag.

Yet another advantage of aspects of the present invention is that the pre-printed tag may turns into a receipt with full information including payments made after checkout. Because the checkout tags are one-time recordable, the transaction recordings are preserved for life making the checkout tags ideal as receipts for post-sale transactions such as payment verification, proof of purchase, expense reporting, warranty tracking, and the like.

Payment tags in accordance with the present invention may trigger display of multimedia information on the buyer's mobile device such as product information and manufacturer messages in audio or video format. This is not possible with the existing closed loop point of sale devices and scanners.

Further features and advantages of the present invention, as well as the structure and operation of various aspects of the present invention, are described in detail below with reference to the accompanying drawings.

BRIEF DESCRIPTION OF THE DRAWINGS

The features and advantages of the present invention will become more apparent from the detailed description set forth below when taken in conjunction with the drawings in which like reference numbers indicate identical or functionally similar elements. Additionally, the left-most digit of a reference number identifies the drawing in which the reference number first appears.

FIG. 10-A is a flowchart illustrating a process for moving the content associated with a first media tag to a second media tag according to an aspect of the present invention.

FIG. 10-B is a block diagram illustrating a process for moving the content associated with a first media tag to a second media tag, according to an aspect of the present invention.

FIG. 11-A is a graphical user interface play or record screen displayed by a tag scanner application according to an aspect of the present invention.

FIG. 11-B is a graphical user interface fast play screen displayed by a tag scanner application according to an aspect of the present invention.

FIG. 22 is a flowchart illustrating a process for a payment service provider to facilitate checkout utilizing checkout tags, according to an aspect of the present invention.

FIG. 23 is a flowchart illustrating a process for a tag service provider to facilitate a payment by performing a tag check, according to an aspect of the present invention.

FIG. 24 is a flowchart illustrating a process for facilitating tag recording from the customer viewpoint, according to an aspect of the present invention.

DETAILED DESCRIPTION

Overview

Figure 1:
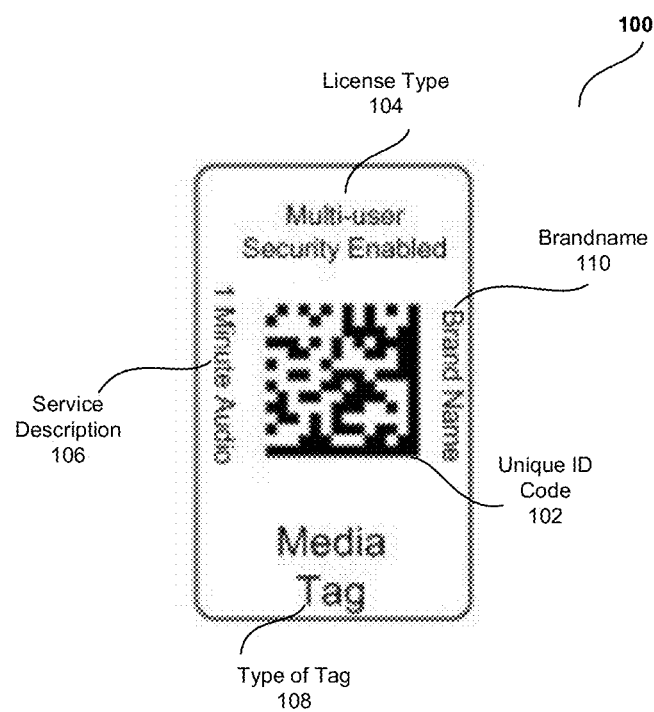
FIG. 1 is a block diagram illustrating an exemplary low-cost media tag according to one aspect of the present invention.

As will be apparent to those skilled in the relevant art(s) after reading the description herein, systems, processes, and computer program products useful for creating and implementing aspects of media tags and the associated systems may be adapted or otherwise extended for mobile payment tag methods and computer program products described herein.

The present invention is directed to systems, methods and computer program products for storing, securing, identifying, authenticating and retrieving multimedia messages using low-cost barcode or RFID tags as virtual storage mediums.

In one aspect of the present invention, a media tag (as described herein) provides a simple and elegant way to record information about what is stored in a closed container (e.g., a cardboard box). That is, cardboard boxes are widely used for storing items in warehouses, offices, stores and even homes. Typically, to find out what is stored in the box, users write on a piece of scrap paper and stick it to the box, or in case of commercial usage, they print out a bill of lading, shipping list or some other paper that is affixed to the box. In such an aspect of the present invention, however, the user can affix a media tag to the box and use a mobile telephone to scan the media tag to facilitate a voice recording describing the contents of the box. At some future time, when the user comes back to search and retrieve contents, they can scan the media tag affixed to the box which facilitates the playback of the recording describing the content of the box. In alternate aspects, a media tag can be associated not only with a voice recording, but with other multimedia such as a picture.

In one aspect of the present invention, end users may obtain media tags through a retail or a wholesale distribution mechanism, such as a pad of Post-It® notes (or any other brand or kind of note paper with attaching means capable of being affixed to common object surfaces while allowing multiple and easy repositioning) which would then serve as the low-cost tag with each sheet of the pad having a pre-printed unique identifier (e.g., barcode, RFID inlay, etc.).

In one aspect of the present invention, end users may obtain the tag scanner application from a service provider either through a CD or a Web download directly onto their mobile telephone. In an alternate aspect, the end user may obtain the tag scanner application on their mobile telephone as part of the pre-loaded applications loaded by the manufacturer, distributor or service provider of the mobile telephone.

In another aspect of the present invention, a user first establishes a context with which the user wants to associate a multimedia file (e.g., record a voice note to be stored in *.wav file or take a picture to be stored in a *.jpg file). Depending upon the materials of which the media tag is constructed, this is accomplished by either attaching the media tag to the context (i.e., an object or item associated with the context) or, if physical location is the context, hanging the media tag near a location.

In such an aspect, in order to record the information on the media tag, the user starts the tag scanner application on the mobile telephone which immediately readies the mobile camera to scan the media tag. The user then views the media tag through the camera screen appropriately to capture the visual symbol imprinted on the media tag. The tag scanner application then prompts the user to record a message based on the information on the media tag. In alternate aspects, the media tag may specify one of the multiplicity of multimedia types for recording, such as text, audio, video or picture. In the case of an audio recording, for example, the tag scanner application simply prompts the user to start recording. For picture or video recording, the tag scanner application opens the camera again for the user to take a picture or record a video. For text recording, the tag scanner application opens an editor for the user to input textual information.

In another aspect of the present invention, in order to play back any previously-recorded multimedia information, the user would start the tag scanner application on the mobile telephone which immediately readies the mobile camera to scan the media tag. The user then views the media tag through the camera screen appropriately to capture the visual symbol imprinted on the media tag. The tag scanner application then checks if there is already stored multimedia content associated with the media tag. If there is, the tag scanner application causes the stored information to play or display (as appropriate).

In another aspect of the invention, low-cost tags are used to facilitate transactions. Transactions may occur in a retail setting, a restaurant, in a peer-to-peer setting, or any other setting where value is exchanges for goods or services. A retail vendor or other seller may obtain pre-printed checkout tags from a tag service provider (TSP). Each tag is unique with a set of printed identifiers and machine readable portion, such as a barcode. The vendor may register all the tags in a given batch using a booklet registration process and submits his financial account information for receiving payments. This process ties all the pre-printed checkout tags in a given batch (e.g., a roll such as the roll shown in FIG. 15) to the vendor's financial account, and any registered tag scanned henceforth will show vendor detail.

Tag-based transactions allow a vendor or other seller to record a singular instance of a product or transaction service information in the form of audio, video or text and pricing on each tag uniquely. The seller may accomplish this via a mobile phone application and scanning the barcode on each tag in a fashion similar to the media recording mechanisms described herein and in the '124 application, the '828 patent and the '624 patent.

The recorded checkout tag is then presented to the end customer as a label attached to a singular instance of a product or as part of a checkout bill for a service. The customer or other buyer has a mobile device equipped with a mobile wallet application. The buyer scans the tag with their mobile device, reading the product and pricing information. If the customer wants to pay and complete the checkout process, customer uses the mobile wallet and makes the payment. The payment receipt returned is recorded and is associated with the tag which completes the checkout process.

The tag may also serve as a receipt. The buyer, the seller, or a representative of the seller such as a retail clerk, may scan the tag and access the transaction information. The transaction information may include, but is not limited to, a complete record of transaction which include the merchant name, product or service detail, price and payment record. Actual settlement of charges and transferring the money among various parties is handled in the background as is done in the prevailing payment ecosystem.

Thus, the invention uses a low cost pre-printed tag to conduct a series of transaction recordings on the tag by mobile applications first by creating a checkout tag and then transforming it into a receipt. All the transactions in this invention are one time recordings and cannot be changed or erased assuring security and transaction audit trail.

The present invention is now described in more detail herein in terms of the above exemplary contexts. This is for convenience only and is not intended to limit the application of the present invention. In fact, after reading the following description, it will be apparent to those skilled in the relevant art(s) how to implement the following invention in alternative aspects (e.g., using different low-costs tags, affixing the tags to other real-world objects not mentioned herein, the storage/retrieval of other types of multimedia information, the running of the tag scanner application on devices other than a mobile telephone, and the like).

The terms "user," "end user," "customer," and "consumer," and/or the plural form of these terms are used interchangeably throughout herein to refer to those persons and entities who would benefit from the systems, methods and computer program products that the present invention provides for storing, securing, identifying, authenticating and retrieving multimedia messages using low-cost barcode or RFID tags as virtual storage mediums.

The terms "vendor," "payee," "seller" and "retailer" and/or the plural form of these terms are used interchangeably throughout herein to refer to merchants, contractors, small business owners or any other person or entity that sells goods and services to a consumer and receives payment in return. Vendor is a payee from payment point of view.

The terms "customer," "consumer" or "payer" and/or the plural form of these terms are used interchangeably throughout herein to refer to a paying customer who interacts with a vendor, shops for retail products or obtains services.

The terms "app," "application" and "mobile application" and/or the plural form of these terms are used interchangeably throughout herein to refer to a mobile device application used, in the context of this invention, for recording information and making payments with a mobile wallet.

The terms "payment service provider" and "PSP" and/or the plural form of these terms are used interchangeably throughout herein to refer to any entity that maintains mobile wallet with financial account information on behalf of consumer. PSP is typically the app developer/provider.

The terms "tag service provider" and "TSP" and/or the plural form of these terms are used interchangeably throughout herein to refer to any entity that manufactures and distributes checkout tags. TSP provides registration services and database lookup for vendors and PSP app. A TSP and PSP can be the same or different entities.

Media Tag Design

Referring to FIG. 1, a block diagram illustrating an exemplary low-cost media tag 100 according to one aspect of the present invention is shown. Media tag 100 may be constructed from paper, metal, leather, plastic or any other low-cost, suitable material with attaching means (any "sticky" low-tack adhesive, Velcro® fastener, slot, hole or the like which allows for easy and multiple repositioning) so that it can be affixed to an object. Media tag 100 allows information to be imprinted onto it, including: a unique visual identifier code 102 so that it can be read using a mobile telephone camera or other sensor enabled mobile telephone (e.g., the camera on a Nokia N95 Smartphone); a usage license type 104, a service description 106, a tag type 108 and a brand name 110.

In such an aspect, unique visual identifier code 102 can be any unique identifier, such as a 2D barcode (e.g., Data Matrix, MaxiCode or QR Code), or an RFID inlay for an RFID tag.

Usage license type 104, in such an aspect, can be one of the following as shown in Table 1.

TABLE 1

| Usage License | Description |
| --- | --- |
| Single User | The content can be recorded and played back on the same mobile device. The content is stored locally onto the digital storage medium of the mobile device (i.e., the device's internal memory or an installed media card). |
| Multi-User | The content can be recorded using one mobile device and played using a different mobile device by a different user. The content is stored on a network storage offered by a service provider. |
| Secure Multi-User | Multi-user license with enhanced security which requires a security tag 1202 to be applied along side of media tag 100 by the end user recording the content. Recording and play back requires both tags to be scanned. Recording can be done by one mobile device and play back can be done using a different mobile device by a different user. |

Service description 106, in such an aspect, can be one of the following shown in Table 2.

TABLE 2

| Service | Description |
| --- | --- |
| 1 Minute Audio | Record one minute of audio content |
| Single Picture | Record single picture to the tag |
| Multiple Pictures | Record multiple pictures to the tag |
| 30 Second Video | Record 30 seconds of video content |
| 140 Char Text | Record (enter) 140 characters of text |
| 48-bit Security | This denotes a 48-bit security code applied to media tag 100. When this tag is scanned the tag scanner application software asks the user to also scan the media tag if not already scanned. |

As will be appreciated by one skilled in the relevant art(s) after reading the description herein, the end user simply needs to scan media tag 100, and tag 100 has built-in application identifiers corresponding to the specific service description 106 printed on the tag itself. Thus, tag scanner application software will automatically start the appropriate service facilitating the user to record the appropriate multimedia content. Because media tag 100 functions as a virtual storage medium, service description 106 enables an end user to discern what the tag is and how it can be used.

In such an aspect, tag type 108 identifies tag 100 as either a "media" tag or a "security" tag (as described below), and brand name 110 would simply be the service provider's trademark/brand to identify the source of the tag 100 purchased by the end user.

In an aspect of the present invention, there are four design considerations to the design of media tags 100. These are: identity, authentication, user experience, and physical access. First, media tags 100 employ a unique identifier so that the content stored on a digital storage medium is unambiguously tied to the media tags' identifier. Second, media tags 100 must be authenticated to avoid confusion and unauthorized data access if users or third parties are allowed to print similar visual codes as those of the service provider for the purpose of hacking. Third, in order to simplify the user experience, media tags 100 must indicate to the tag scanner application on the mobile telephone what the media tag is for and what feature needs to be invoked when scanned. Fourth, there needs to be sufficient security so that the information is not accessed by unauthorized persons and information is recorded and accessed back only when someone has physical access to the media tag 100.

Figure 2:
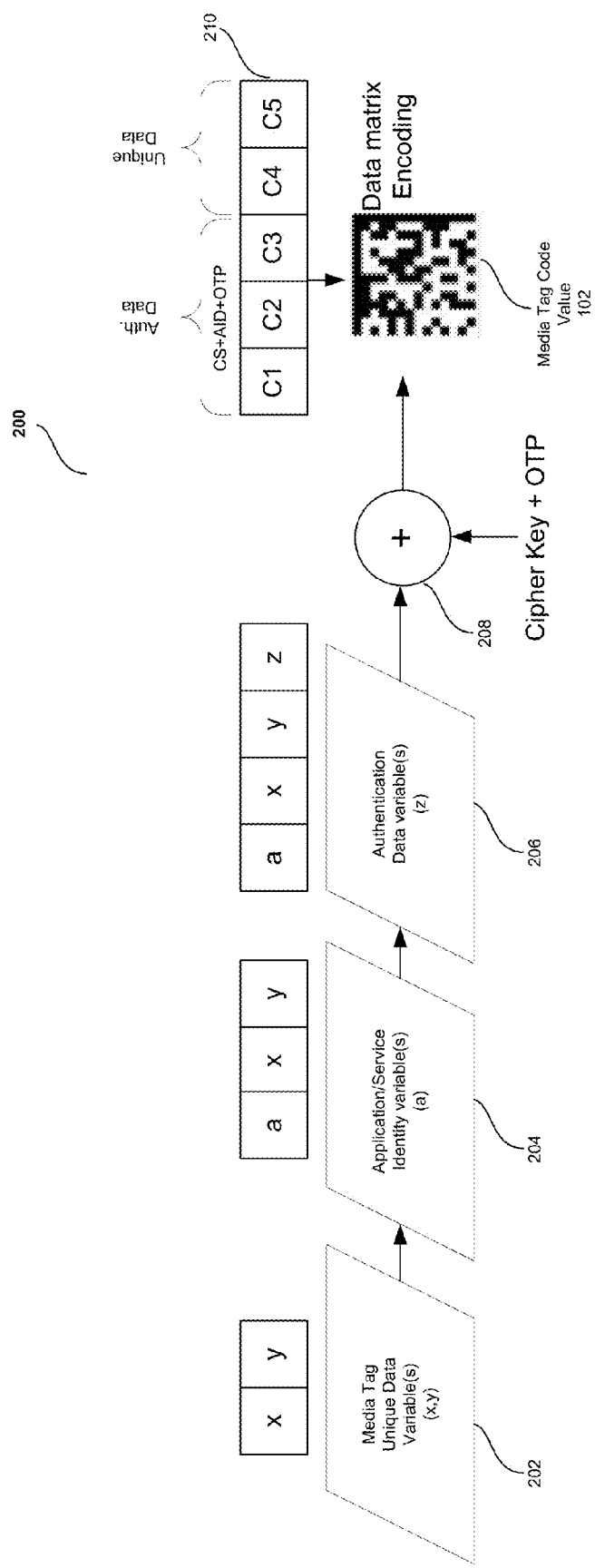
FIG. 2 is a flowchart illustrating a unique visual identifier code creation process according to one aspect of the present invention.

Referring to FIG. 2, a flowchart illustrating a unique visual identifier code creation process 200, according to one aspect of the present invention, is shown. That is, in such an aspect, a unique visual identifier code 102 (e.g., an encoded Data Matrix 2D barcode) is created using process 200 for imprinting onto a media tag 100.

In such an aspect, process 200 comprises utilizing a set of unique data variables, an application identity variable and a set of authentication data variables. In a step 202, x and y as unique data variables are specified, and determine the uniqueness of the overall information code 102 generated. In a step 204, a variable a is added as an application identity variable (AID) to identify the service to be invoked when the tag 100 is eventually utilized (i.e., indicating a service description 106). In a step 206, an authentication variable z is generated using, for example, a checksum (CS) method. In a step 208, a ciphered information code is generated using a cipher, including a randomly-generated one time pad (OTP). In a step 210, a visual construction of the ciphered information code is generated using a data matrix 2D encoding process. This results in the media tag value 102 and thus process 200 terminates.

As will be appreciated by a person skilled in the relevant art(s), the following elaboration of process 200 is simply an example and the actual implementation may vary in terms of number of variables used for each of the steps of process 200.

In such an aspect, process 200 ensures the uniqueness of identifier code 102 by data variables x and y which are a set of counters with values in the range of, in one aspect, 0 to 255. In such an aspect, the 0-255 value range allows the value to be represented by an 8-bit ASCII character based variable. A string S, representing the unique value using x and y can thus be represented as:

$$S = chr(x)(+)chr(y)$$

where (+) is a simple concatenation of ASCII characters represented by variables x and y, and the chr( ) function converts the specified ASCII character hexadecimal code to a character. For example, with $x=61_H$ and $y=62_H$, the string S with the concatenation of ASCII character values of x and y becomes S="ab".

Figure 3:
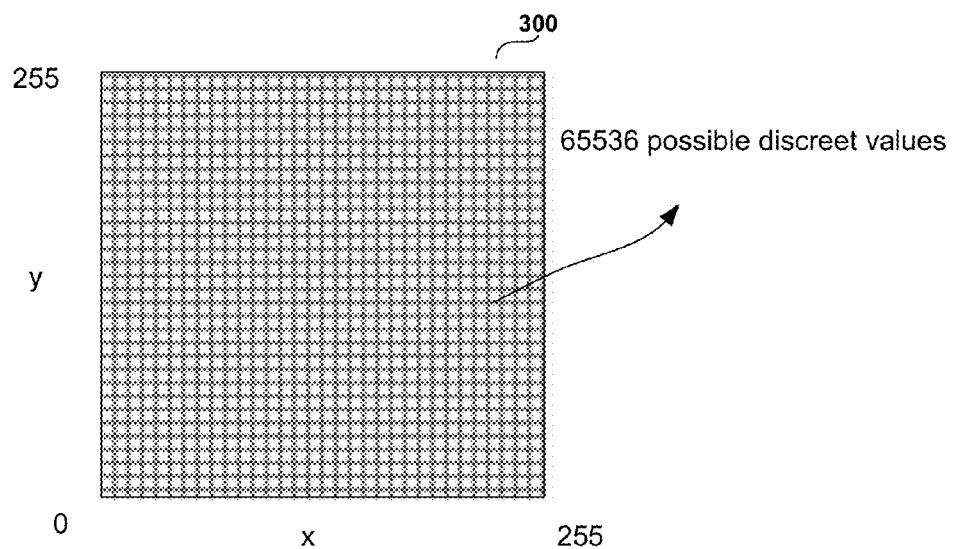
FIG. 3 is a diagram illustrating a data variable space of ASCII character values used in creating an identifier code for a low-cost media tag according to one aspect of the present invention.

Referring to FIG. 3, a diagram illustrating a data variable space 300 of ASCII character values of x and y used in creating identifier code 102, according to one aspect of the present invention, is shown. To visualize S in data space 300, S can be considered as a polynomial function governed by the values of variables x, y where x and y are each less than or equal to 255. Thus, data variable space 300 is the plot of a polynomial function equivalent of string S considering all valid points represented by data variables (x,y).

Data variable space 300 illustrates that if identifier code 102 is generated with two variable counter values—x and y—there are a total of 65,536 distinct and valid possible values. If these two variables solely formed part of media tag identifier 102, then it would be easy for an unauthorized party to randomly generate and print media tags 102 as every value of x and y randomly generated would be valid. Thus, in an aspect of the present invention, a third data variable z representing a checksum is also employed using the following formula:

$$z = (x+y) \bmod 255$$

Figure 4:
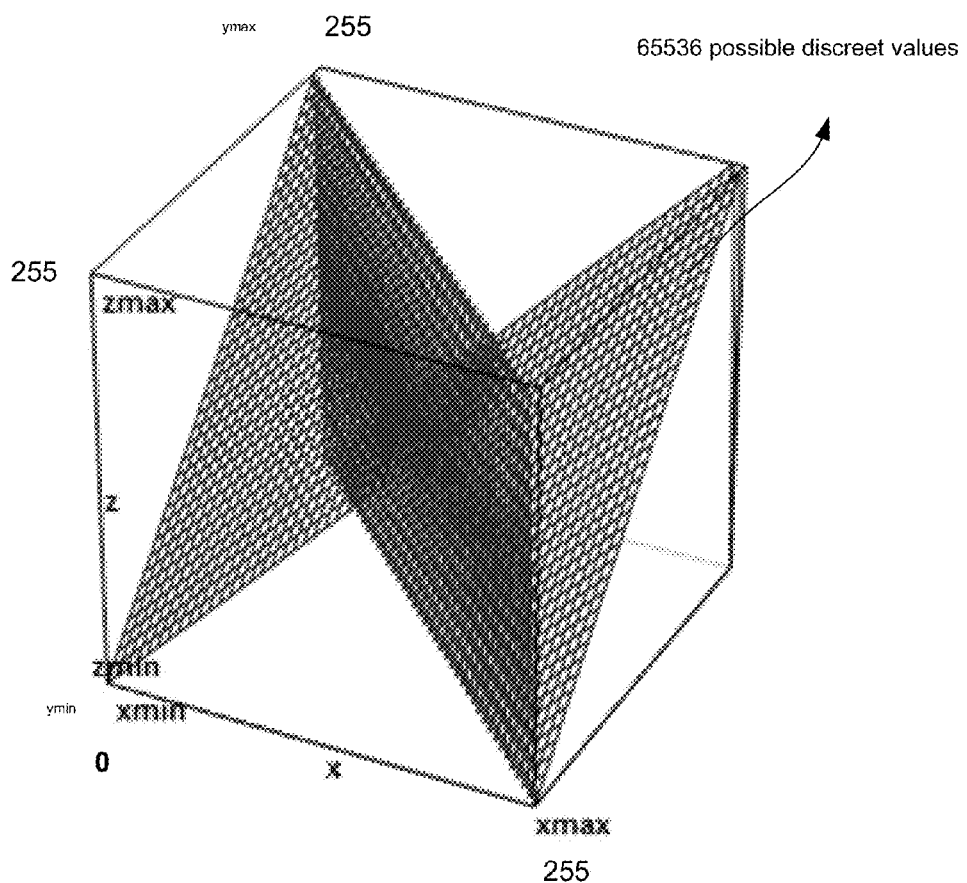
FIG. 4 is a diagram illustrating a data variable space of ASCII character values used in creating an identifier code for a low-cost media tag according to one aspect of the present invention.

Referring to FIG. 4, a diagram illustrating a data variable space 400 of ASCII character values of x, y and z used in creating identifier code 102, according to one aspect of the present invention, is shown. That is, grid 400 shows the valid set of values of string S formed as a polynomial function with the help of three variables—x, y and z. Because the total range of values represented by 8-bit variables x, y and z is 16,777,216 (i.e., $256^3$) and the valid set of values forming grid 400 are only 65536, it is possible to the authenticate identifier code 102 value of media tag 100 by checking the value of z in the string S, represented by variables x, y and z. Any value of media tag that doesn't conform to the relationship between x, y, and z variables are invalid.

In such an aspect, as will be appreciated by one skilled in the relevant art(s), 65536 identifier code 102 values are valid out of a total possible range of over 16 million. While this authentication certainly helps ascertain a valid media tag 100, the security aspect of media tag 100 is not completely satisfied. This is because unauthorized persons may still attempt a hack by understanding the relationship between variables x, y and z as detailed above because the relationships are easily visible from their imprint on media tags 100. That is, those skilled in the relevant security arts and algorithmic design may determine how to generate new media tags 102 by examining a few previously-printed media tags 100 as the underlying information structure is visible to the trained eye or with the help of computers.

Given the above, from a security point of view, it is necessary to encrypt the underlying data structure to randomize the variable space. In one aspect, this is achieved by selecting a suitable cryptographic method which keeps the length of string S small while hiding the underlying variable values and any relationship between them. This assures that the underlying encoding of a barcode or RFID tag structure is efficient from a cost and size point of view as there are fewer values to be encoded. Thus, in alternate aspects, a cipher technique that preserves the size of the encrypted information as close to original information element length as possible is employed (e.g., XOR cipher, One Time Pad, Vernam cipher, Vigenere cipher or the like).

Figure 5:
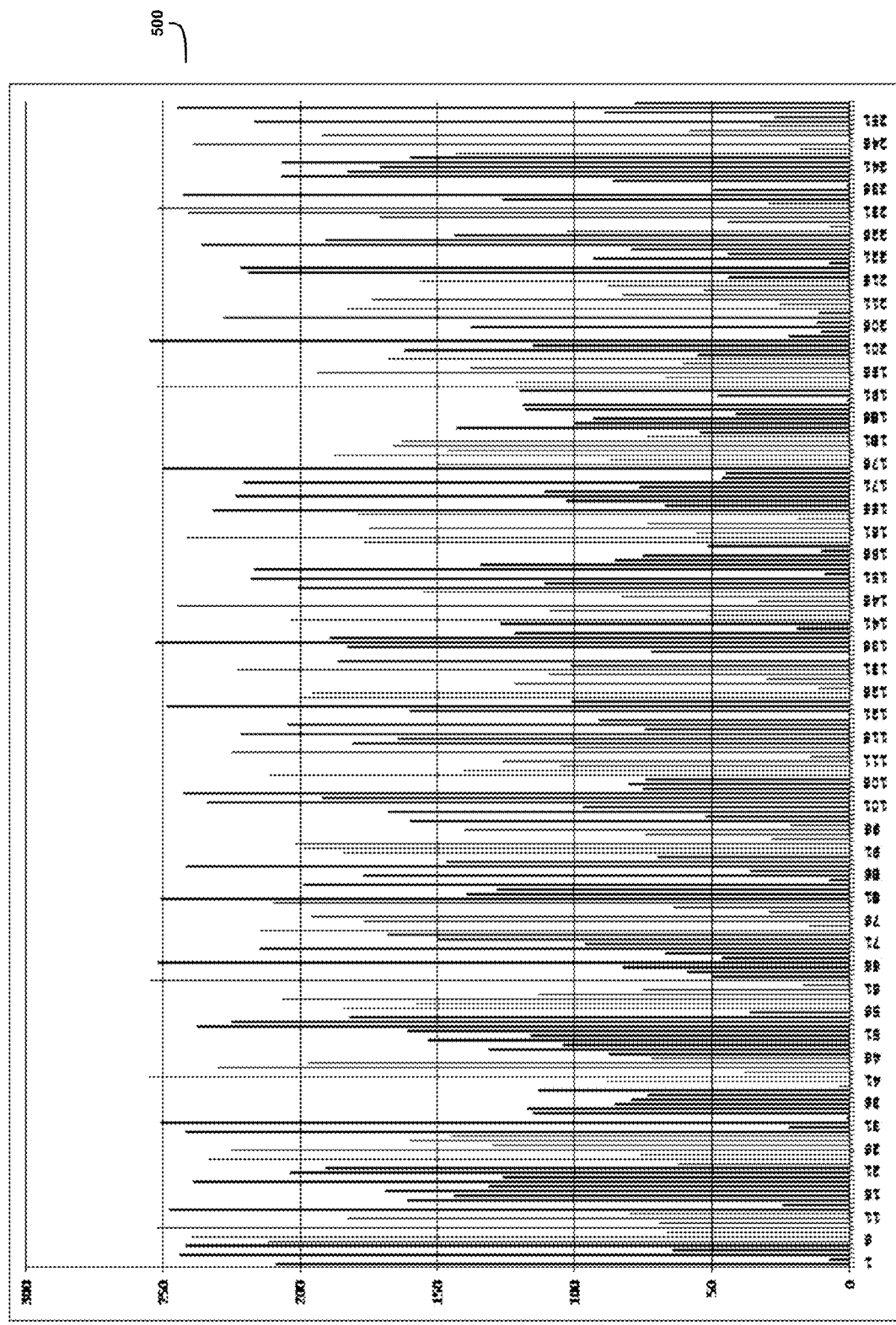
FIG. 5 is a graph illustrating an example of variable randomization with the use of a cipher mechanism during the creation of an identifier code for a low-cost media tag, according to an aspect of the present invention.

Referring to FIG. 5, a graph 500 illustrating an example of randomization of variables with the use of an XOR cipher mechanism during the creation of an identifier code 102, according to an aspect of the present invention, is shown. That is, graph 500 plots the value of variable z after employing the cipher mechanism. As will be appreciated by those skilled in the relevant art(s), the contrast between grid 400 and graph 500—the former showing a "well behaved" value of z as it is computed as a simple checksum, the later showing random values of z due to ciphering. (For clarity, graph 500 is shown as a two-dimensional representation of variable z values, whereas grid 400 is a 3-dimensional depiction.)

In an aspect of the present invention, the final value of identifier code 102 imprinted on media tag 100 is thus generated by a combination of unique data identifier, application identifier and authentication variables whose values are encrypted using a length-preserving cipher algorithm. This is shown in FIG. 2 (process 200), where ciphered authentication variables C1, C2 and C3 represent a checksum (CS), application identifier (AID) and One Time Pad (OTP) cipher technique.

As will be appreciated by one skilled in the relevant art(s) after reading the description herein, process 200 embeds media tag 100 authentication within the value of identifier code 102 itself, and thus alleviates the need to implement a network-based authentication system and the associated over head typically seen in online content access in traditional Web-based systems. This is because, in process 200, there is no need to identify and authenticate a user, as such function is now shifted to media tag 100 authentication. The media tag-based authentication is similar to authentication using certificates (where certificates are stored in the end user machine), except that the "certificate" here is just a unique value embedded within the cipher-encoded space 102 of each media tag 100.

Tag-based authentication process 200 facilitates physical access-based security where if someone can read and scan media tag 100, they can get to the information. With such a model there is no need to identify or authenticate the user's identity. This feature is critical for multi-user implementation of media tag 100 where the information written by one user may be consumed by another user as long as they can access media tags 100. In such an aspect, users and their identities are not known and not necessary.

Media Tag Operations

In an aspect of the present invention, a tag scanner application capable of being stored and executed on a mobile telephone, that is used for recording, manipulating and playing information stored virtually on media tags 100 is provided. In such an aspect, the tag scanner application provides a set of operations done for managing content using media tags 100, including record, play, fast play, clear and move operations.

Figure 6:
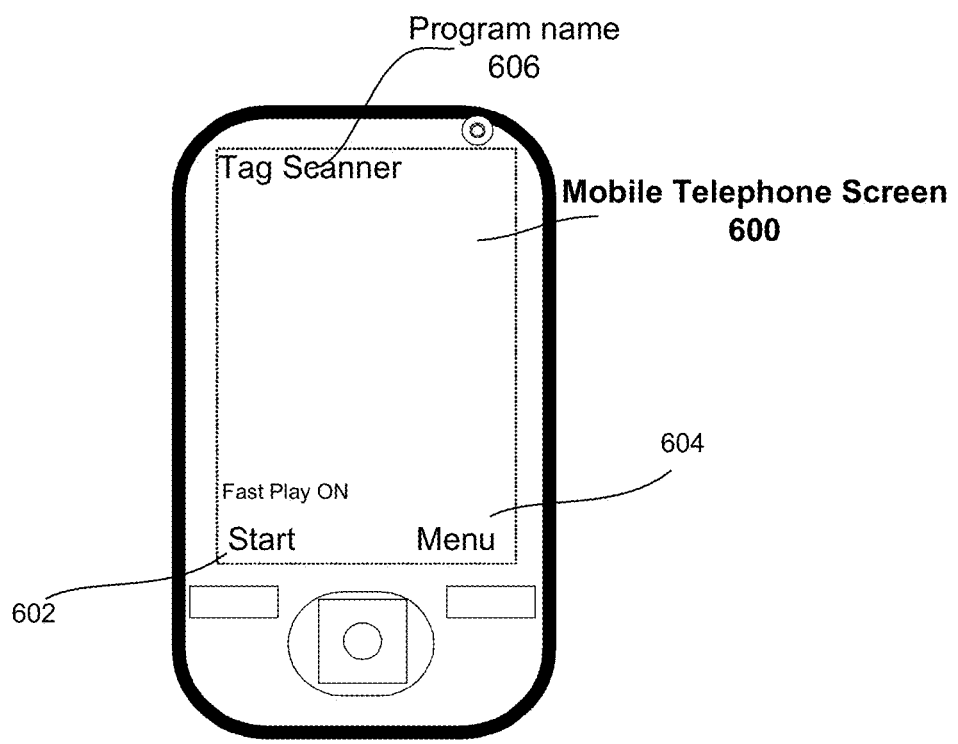
FIG. 6 is a graphical user interface home screen displayed by a tag scanner application according to an aspect of the present invention.

Referring to FIG. 6, a graphical user interface home screen 600 displayed by the tag scanner application executing on a mobile telephone according to an aspect of the present invention is shown. Home screen 600 has a Start button 602, a Menu button 604 and a program name label 606. In such an aspect, when Start button 602 is pressed, the tag scanner application switches on the camera built-in or connected to the mobile telephone to start scanning a media tag 100 for the purpose of playing or recording the content. The tag scanner application makes an automatic determination to record or play content based on whether the Tag is "empty" or if there is a prior recording of content, respectively. As will be appreciated by one skilled in the relevant art(s) after reading the description herein, this automatic determination reduces the number of key strokes needed and improves user experience.

Figure 7:
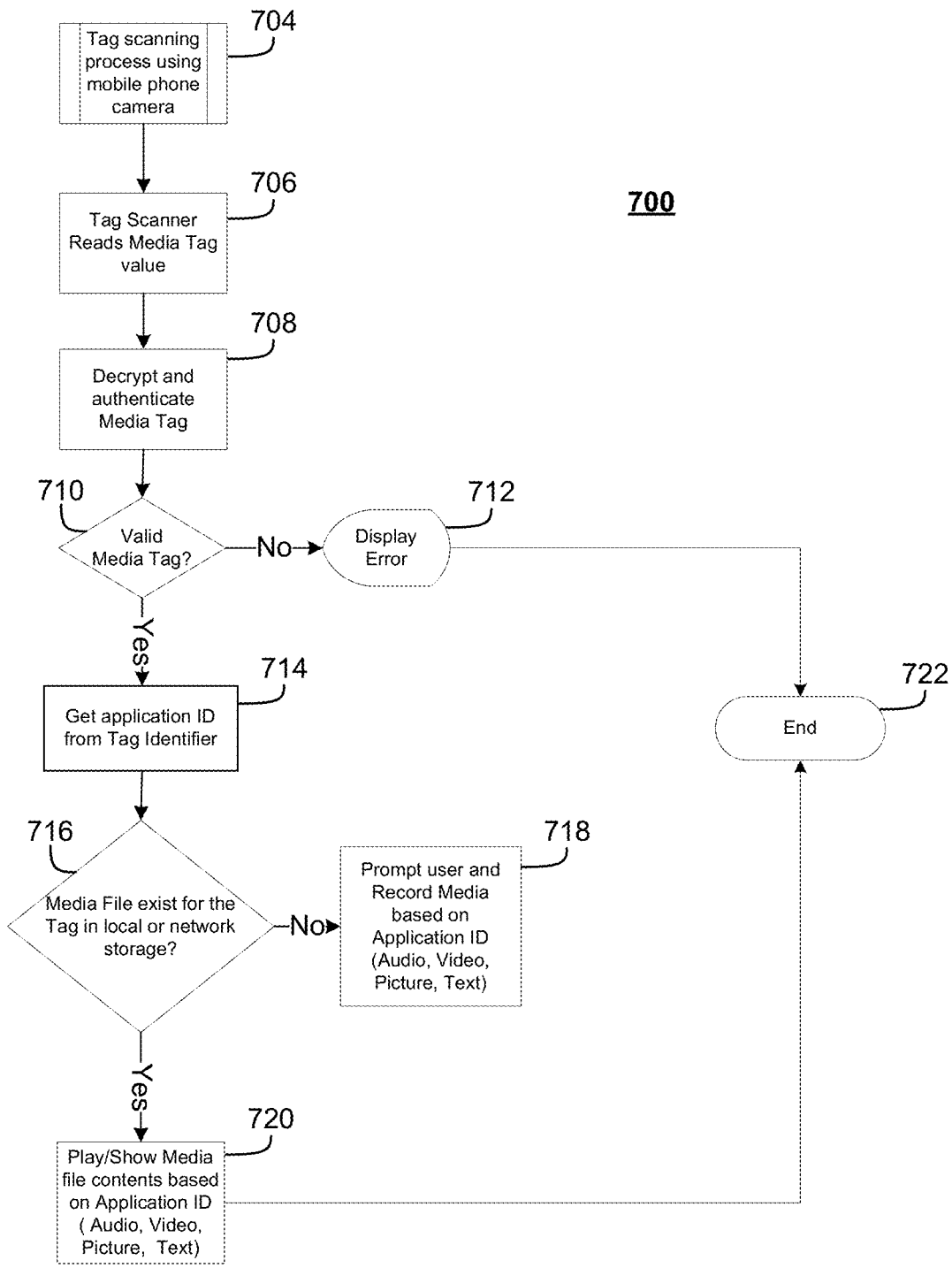
FIG. 7 is a flowchart illustrating a process for recording or playing of content associated with a media tag according to an aspect of the present invention.

Referring to FIG. 7, a flowchart illustrating a process 700 for recording or playing of content associated with a media tag 100, according to an aspect of the present invention, is shown. Process 700 begins at step 704 and proceeds immediately to step 706 where media tag 100 is scanned. In step 708, media tag 100 is decrypted using a pre-determined secret key to ascertain the identity and authentication variable values from the unique code 102 imprinted onto tag 100.

In step 710, process 700 determines if the unique code 102 read in step 708 is valid. If not, an error is displayed to the users mobile telephone in step 712 and process 700 terminates as indicated by step 722. Otherwise, process 700 proceeds to step 714.

In step 714, process 700 utilizes the application identifier (which is one of the authentication variables obtained from step 708) to determine the operation needed to be performed after the scan. The operation to be performed, in an aspect, includes: record or play voice; record or play video; record or show picture; or enter or show text. Further, the application identifier also denotes if media tag 100 is used for single user or multiple users.

In step 716, process 700 determines if there is already content stored that is associated with the specific media tag 100 just read in step 706. Such content may be located in the local store (i.e., the memory of the mobile phone) for single user operation or network store for multi-user operation (similar to the disclosure in the '624 patent).

If there is already content associated with media tag 100 (and stored in the local or network storage) then process 700 proceeds to step 720. In step 720, the content is played. If there is no content recorded a priori, then process 700 proceeds to step 718 where the user is prompted to record content appropriately based on the type of the content denoted by the application identifier. Process 700 then ends as indicated by step 722.

As will be appreciated by one skilled in the relevant art(s) after reading the description herein, the unique identifier code 102 allows tag 100 to serve as a virtual multimedia storage medium. That is, the scanning/reading of tag 100 allows the tag scanner application to use code 102 to serve as an index into the local mobile telephone memory or network store to quickly retrieve multimedia files in a quicker, more secure and more convenient manner than conventional file storing and retrieval methods.

Figure 8:
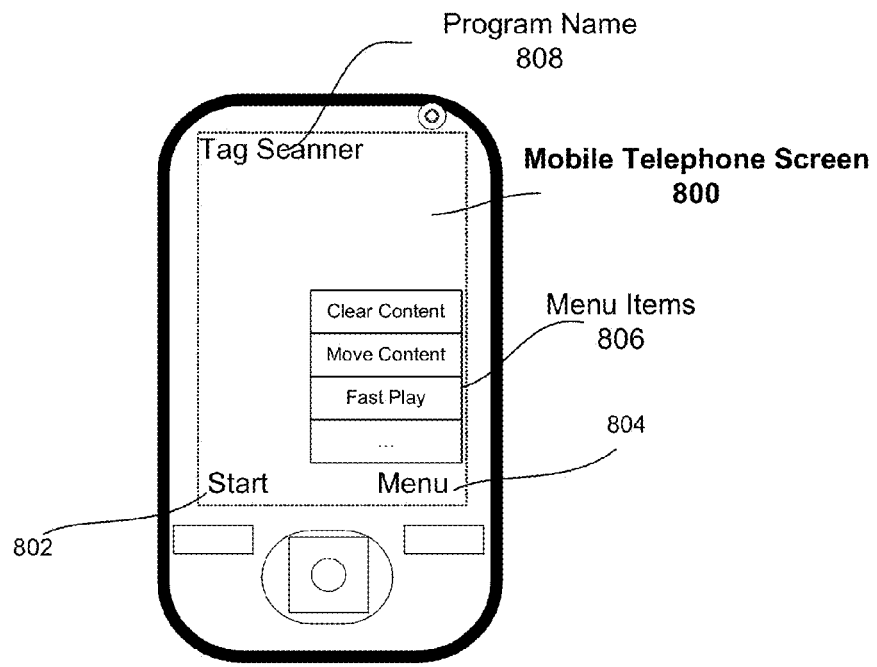
FIG. 8 is a graphical user interface menu screen displayed by a tag scanner application according to an aspect of the present invention.

Referring to FIG. 8, a graphical user interface menu screen 800 displayed by the tag scanner application executing on a mobile telephone according to an aspect of the present invention is shown. Menu screen 800 has a Start button 802, a Menu button 804, a menu panel 806 and a program name label 808. Menu panel 806 lists Clear Content, Move Content and Fast Play as exemplary operations which may be performed on media tag 100. In such an aspect, as an example of a menu operation, when Menu button 804 is pressed the user can select the "Clear Content" option from menu panel 806. Upon this selection, the tag scanner application switches on the camera to start scanning a media tag 100. After the scan, the user may clear tag 100 by re-recording content associated with the tag. This may be done for many reasons. For example, if tag 100 is printed on a metal tag affixed to a certain piece of equipment, the recording associated with the tag can be changed by clearing the content and re-recording new content. This avoids the need for a new tag to be affixed to the equipment every time new data associated with the equipment becomes available (which can be expensive).

Figure 9:
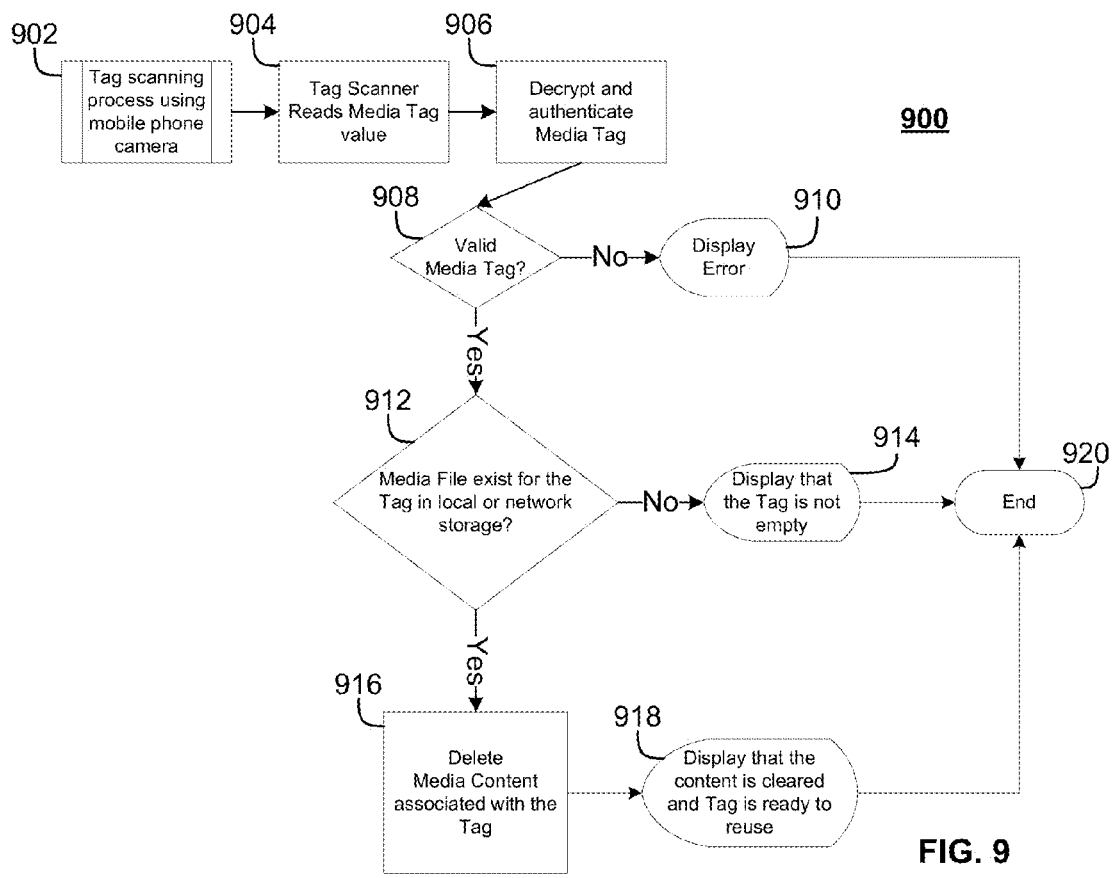
FIG. 9 is a flowchart illustrating a process for clearing the content associated with a media tag according to an aspect of the present invention.

Referring to FIG. 9, a flowchart illustrating a process 900 for clearing the content associated with a media tag, according to an aspect of the present invention, is shown. Process 900 begins at step 902 and proceeds immediately to step 904 where media tag 100 is scanned. In step 906, media tag 100 is decrypted using a pre-determined secret key to ascertain the identity and authentication variable values from the unique code 102 imprinted onto tag 100.

In step 908, process 900 determines if the unique code 102 read in step 906 is valid. If not, an error is displayed to the user's mobile telephone in step 910 and process 900 terminates as indicated by step 920. Otherwise, process 900 proceeds to step 912.

In step 912, process 900 determines if there is already content stored that is associated with the specific media tag 100 just read in step 904. Such content may be located in the local store (i.e., the memory of the mobile phone) for single user operation or network store for multi-user operation (similar to the disclosure in the '624 patent). If there is no content associated with tag 100, an error is displayed to the users mobile telephone in step 914 and process 900 terminates as indicated by step 920.

If there is already content associated with media tag 100 (and stored in the local or network storage) then process 900 proceeds to step 916. In step 916, the content associated with tag 100 is deleted. Process 900 then ends as indicated by step 920.

Referring to FIG. 10-A, a flowchart illustrating a process 1000 for moving the content associated with a first media tag to a second media tag, according to an aspect of the present invention, is shown. Process 1000 is initiated by selecting the Move Content menu item from menu panel 806. Process 1000 begins at step 1002 and proceeds immediately to step 1004 where a first media tag 100 is scanned. In step 1006, first media tag 100 is decrypted using a pre-determined secret key to ascertain the identity and authentication variable values from the unique code 102 imprinted onto tag 100.

In step 1008, process 1000 determines if the unique code 102 read in step 1004 is valid. If not, an error is displayed to the users mobile telephone in step 1010 and process 1000 terminates as indicated by step 1034. Otherwise, process 1000 proceeds to step 1012.

In step 1012, process 1000 determines if there is already content stored that is associated with the specific first media tag 100 just read in step 1004. Such content may be located in the local store (i.e., the memory of the mobile phone) for single user operation or network store for multi-user operation (in a similar fashion to the disclosure in the '624 patent). If there is no content associated with tag 100, an error is displayed to the users mobile telephone in step 1014 and process 1000 terminates as indicated by step 1034.

If there is already content associated with first media tag 100 (and stored in the local or network storage) then process 1000 proceeds to step 1016. In step 1016, process of processing a second media tag 100 begins, and in step 1018, the second media tag 100 is scanned.

In step 1020, second media tag 100 is decrypted using a pre-determined secret key to ascertain the identity and authentication variable values from the unique code 102 imprinted onto tag 100.

In step 1022, process 1000 determines if the unique code 102 read in step 1006 is valid. If not, an error is displayed to the users mobile telephone in step 1024 and process 1000 terminates as indicated by step 1034. Otherwise, process 1000 proceeds to step 1026.

In step 1026, process 1000 determines if there is already content stored that is associated with the specific second media tag 100 just read in step 1018. Such content may be located in the local store (i.e., the memory of the mobile phone) for single user operation or network store for multi-user operation (in a similar fashion to the disclosure in the '624 patent). If there is content associated with tag 100 (and stored in the local or network storage), an error is displayed to the users mobile telephone in step 1028 and process 1000 terminates as indicated by step 1034.

If there is no content associated with second media tag 100, then process 1000 proceeds to step 1030. In step 1030, the content associated with the first tag 100 is then made to be associated with the second media tag 100 and disassociated (i.e., "deleted") from the first media tag 100 in one atomic operation. The results of this operation are then displayed to the user on mobile screen 800 in step 1032. Process 1000 then ends as indicated by step 1034.

As will be appreciated by one skilled in the relevant art(s) after reading the description herein, moving the content associated with a first media tag to a second media tag may be necessary in circumstances where the low-cost media tag may get scratched, smudged, torn or simply wears out. While the media tag is still in readable (but beginning to become worn) condition, the user may want to preserve the content. Instead of rerecording the information onto a new media tag, the content may be moved from one media tag to another media tag as per process 1000. Referring to FIG. 10-B, a block diagram illustrating process 1000 according to an aspect of the present invention is shown. More specifically, it illustrates how content is tagged before and after the content move operation according to an aspect of the present invention.

Referring to FIG. 11-A, a graphical user interface play/record screen 1100 displayed by the tag scanner application executing on a mobile telephone according to an aspect of the present invention is shown. Play/record screen 1100, provided to allow for playing or recording tags 100, has a Stop button 1102, a program name label 1104, a camera view finder window 1106, a tag display 1108, and a screen prompt 1110. In such an aspect, screen 1100 allows a user to record information to be associated with a media tag 100 after the camera has scanned the media tag 100, or play any associated content.

Referring to FIG. 11-B, a graphical user interface fast play screen 1150 displayed by the tag scanner application executing on a mobile telephone according to an aspect of the present invention is shown. Fast play screen 1150, provided to allow for playing multiple tags 100, has a Stop button 1102, a program name label 1104, a camera view finder window 1106, a time display 1108, and a screen prompt 1110. In such an aspect, screen 1150 allows a user to read a media tag 100 and play any associated content while the camera is simultaneously on in order to scan additional media tags 100. That is, while the content associated with a first media tag 100 is still playing, the user may scan another media tag and play the new content—thus pre-empting the previously-playing content. This allows rapid scanning and playing in certain situations without waiting for previous audio or video recording to complete playing. This improves user experience by reducing the number of key strokes needed to play multiple tags.

Multi-User Tags

As will be appreciated by one skilled in the relevant art(s) after reading the above description, aspects of the present invention allow a single user to store, secure, and retrieve multimedia messages using low-cost barcode or RFID tags 100 as virtual storage mediums. In such aspects, the same user who stored the multimedia content may retrieve it using the same mobile telephone. In alternate aspects, however, media tags 100 used to store information recorded by one user may be used by another user to read the same information. In this case the content stored by the first user (who recorded information on a media tag) is stored in a network instead of the local storage in the mobile device (in a similar fashion to the disclosure in the '624 patent).

In order to record information on a multi-user version of media tag 100, user A starts the tag scanner application on the mobile telephone and follows process 700 described above. In this instance, however, the recorded information is not stored locally onto the mobile telephone, but transmitted to a network in communications with the mobile telephone for storage tagged by the media tag value 102 (in a similar fashion to the disclosure in the '624 patent).

When user B wants to retrieve the message, they start the tag scanner application on the mobile phone and scan the media tag value 102. The tag scanner software then contacts a network server to access and play the message (in a similar fashion to the disclosure in the '624 patent). In one aspect, in order to optimize the user experience, the network server streams the information for audio and video media formats so that the user can start hearing/seeing the information immediately.

In a typical Web-based data access mechanism, users are typically identified and they are granted data access privileges for privacy and security, especially in a multi-user environment. In aspects of the present invention, however, there is no need to identify the users, nor grant them privileges. This is accomplished by shifting the burden of identity and authentication to the media tag 100 itself.

In another aspect of the present invention, the data access control privileges are achieved using physical proximity to the tag equipment. That is, the physical proximity-based data access stipulates that if someone can get access to media tag 100 physically and if they are equipped with the appropriate tag scanner application, then they may obtain access to the data. Conversely, it is difficult to have someone access the information by guessing the media tag value 102 and printing (counterfeit) tags themselves to access the data remotely without authorization.

The above-described embedded authentication and consequent physical proximity to equipment based data access allows for a new business model where the media tags 100 can be sold in large quantities (e.g., multiple tags printed on one standard 8.5"×11" sheet of paper or in a roll similar to U.S. postage stamps) through retail chains without knowing who the end user is and without requiring such end users to establish an account with an online service provider to secure their data. (See FIG. 15.) Thus the identity aspect of the media tag 100 design described above is necessary so that each tag is unique. This is accomplished by defining a valid data space for the media tag values which is defined by a set of counters operated centrally by the manufacturer of the media tags. This mechanism ensures that there is no duplication of officially manufactured tags (i.e., to combat counterfeiting). However, to reduce the occurrence of unauthorized production with associated duplication and security issues, there needs to be a mechanism to ensure the originality of the media tag values. This is accomplished by authentication.

Authentication (i.e., the process of ascertaining the identity) of the media tags is accomplished by adding additional data to the identity that encodes some kind of unique relationship among the data variables so that the media tag can be validated (authenticated) by examining this unique relationship. Implicit is the assumption that a randomly generated data do not contain this relationship to any significant probability. However, if the data and relationship is published as media tag value as is, it is akin to publicly announcing the password in the case of accessing a Web site. Therefore the identity data and authentication data needs to be obfuscated to hide the relationship. The obfuscation is accomplished by a cipher key which, when applied to the media tag value, randomizes its data space. The randomized values are used to encode the media tag.

Security Tag Design

The above-described aspects of the media tag 100 design gives rise to a media tag with unique identity, built-in authentication and encryption of the media tag value. In some situations, however, users may desire a higher level of security. In one aspect of the present invention, this is accomplished by appending a long security key to the media tag by way of a different, second tag referred to herein as a "security tag" to an object.

Figure 12:
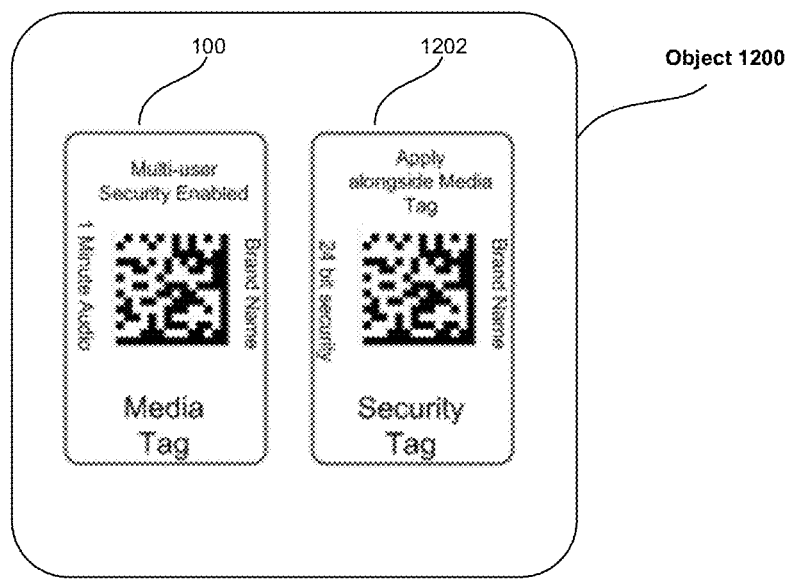
FIG. 12 is a block diagram illustrating an exemplary object affixed with a low-cost security tag used in conjunction with a media tag according to one aspect of the present invention.

Referring to FIG. 12, a block diagram illustrating an exemplary object 1200 affixed with a low-cost security tag 1202 and used in conjunction with a media tag 100, according to one aspect of the present invention, is shown.

In one aspect, security tag 1202 is similar in design to media tag 100, and is applied alongside of the media tag to tag the content as shown in FIG. 12. When a user desires to record information on media tag 100 in a more secure fashion than process 700 described above, the user scans—in one or more scan attempts—both media tag 100 as well as security tag 1202 that has a unique embedded security key. Once the tag scanner application recognizes both tags, it associates the tags if there is no content already stored on media tag 100 and prompts user to record the content. If there is already content stored on media tag 100, the tag scanner application verifies that the security code is matched before playing the content.

Multi User Enhanced Security

In the multi-user aspects of media tag 100 described above, one user may record information and allow another user equipped with the tag scanner application to read the information. In such aspects, although media tag 100 incorporates the security features described above to prevent an unauthorized third party (e.g., a hacker) to randomly guess the valid media tag value 102 and obtain the information, this security may not be sufficient for certain applications. The security risk is similar to the online password mechanisms employed by millions of Web sites around the world where an unauthorized person can "guess" the password and hack into the data. The security mechanism employed in the current model of Web site-based data access is to use longer passwords with special characters (e.g., a mix of lower and upper case letters, use of numbers, etc.). Essentially, this process of applying longer passwords is to reduce the possibility of guessing the correct password by increasing the size of the underlying data space of the password domain.

Therefore, in an aspect of the present invention, security tag 1202, identically designed to media tag 100 with the exception of an application identifier which indicates that it is used solely for security purposes and works along side of a "regular" media tag 100, is employed. In such an aspect, when the tag scanner application reads such an application identifier, it associates security tag 1202 to media tag 100 before accepting or serving the information.

In an aspect of the present invention, security tag 1202 comprises four ASCII characters having 8 bits each. Thus, the total data space covering these four characters is 4,294,967,296 (i.e., $256^4$). If media tag 102 has just one authentication variable, there is simply a one in 256 chance of randomly (but correctly) guessing media tag value 102. By associating security tag 1202 with media tag 102, and tying the content appropriately, the chance of correctly guessing the entire value by a random hacking method is now one in a trillion (or more precisely, $256^5=1,099,511,627,776$).

Figure 13:
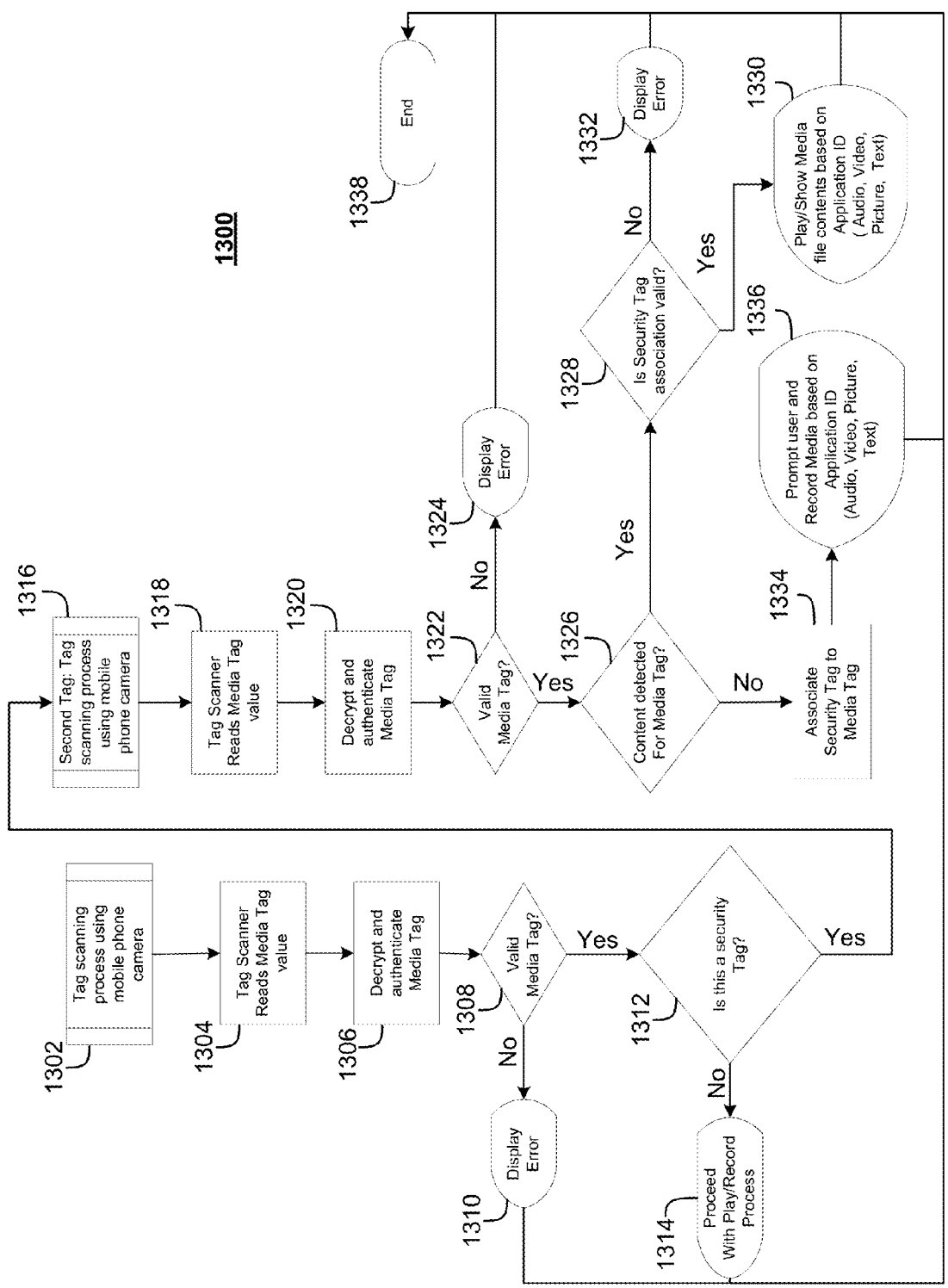
FIG. 13 is a flowchart illustrating a process for storing or retrieving content associated with a security tag according to an aspect of the present invention.

Referring to FIG. 13, a flowchart illustrating a process 1300 for storing or retrieving content associated with a security tag 1202, according to an aspect of the present invention, is shown. Process 1300 begins at step 1302 and proceeds immediately to step 1304 where a tag (media tag 100 or security tag 1202) is scanned. In step 1306, the tag is decrypted using a pre-determined secret key to ascertain the identity and authentication variable values from the unique code 102 imprinted onto tag 100.

In step 1308, process 1300 determines if the unique code 102 read in step 1306 is valid. If not, an error is displayed to the users mobile telephone in step 1310 and process 1300 terminates as indicated by step 1338. Otherwise, process 1300 proceeds to step 1312.

In step 1312, process 1300 determines if the application identifier read in step 1306 is one of a security tag 1202 or a media tag 100. If the tag is a media tag 100, in step 1314, the user is allowed to proceed with normal playback or record functionality as described above, and process 1300 terminates as indicated by step 1338. Otherwise, process 1300 proceeds to step 1316.

In step 1316, processing a second tag (media tag 100 or security tag 1202) begins, and in step 1318, the second tag is scanned. In step 1320, the second tag is decrypted using a pre-determined secret key to ascertain the identity and authentication variable values from the unique code 102 imprinted onto the tag.

In step 1322, process 1300 determines if the application identifier read in step 1318 is one of a media tag 100. If not, an error is displayed to the users mobile telephone in step 1324 and process 1300 terminates as indicated by step 1338. Otherwise, process 1300 proceeds to step 1326.

In step 1326, process 1300 determines if there is already content stored that is associated with the specific second media tag 100 just read in step 1318. Such content may be located in the local store (i.e., the memory of the mobile phone) for single user operation or network store for multi-user operation (in a similar fashion to the disclosure in the '624 patent). If there is content associated with tag 100 (and stored in the local or network storage), process 1300 proceeds to step 1328, otherwise to step 1334.

In step 1328, process 1300 determines if the security code returned by security tag 1202 matches the security code associated with the stored content. If not, then an error is displayed to the users mobile telephone in step 1332 and process 1300 terminates as indicated by step 1338. If there is a match, process 1300 proceeds to step 1330 where the application identifier is utilized to determine the operation needed to be performed (e.g., play voice; play video; show picture; or show text). Process 1300 then terminates as indicated by step 1338.

In step 1334 (if there is no content associated with media tag 100 as determined in step 1326), security tag 1202 is associated with media tag 100. Then, in step 1336, the user is prompted to record content appropriately based on the type of the content denoted by the application identifier of the media tag 100. Process 1300 then terminates as indicated by step 1338.

In alternate aspects of the present invention, as will appreciated by one skilled in the relevant art(s) after reading the description herein, process 1300 may vary depending upon whether the first tag read is a security tag 1202 or a security-enabled media tag 100. In yet alternate aspects of the present invention, process 1300 may vary if both tags are read in one single scan operation. In sum, process 1300 aims to read media tag 100 and security tag 1202 in tandem in a single step or multiple steps, and the appropriate play or record operation is initiated once the association is established or checked.

As will be appreciated by one skilled in the relevant art(s) after reading the description herein, the design of security tag 1202 results in a unique and secure business process because the security tags can be received by the end user independent of how they obtained the media tags. Thus, the application of security tags to the content at the time of end use of the media tags removes any possibility of unauthorized access to the tags (and their valid values) during supply chain transit.

As will also be appreciated by one skilled in the relevant art(s) after reading the description herein, a key benefit of multi-user version of tags and the method of recording and contextually transmitting information is that it eliminates expensive system designs involving B2B information transmission which require maintaining user credentials and access control mechanisms found in traditional Electronic Data Interchange (EDI) systems. Thus, in aspects, the present invention facilitates a much cheaper and innovative alternative for certain kinds of applications where information can be transmitted to different user organizations using low cost tags, in a contextual way, without a need for user identities and digital access control techniques.

Environment

The present invention (i.e., tag scanner application, processes 200, 700, 900 or 1000 or any part(s) or function(s) thereof) may be implemented using hardware, software or a combination thereof and may be implemented in one or more computer systems or other processing systems. However, the manipulations performed by the present invention were often referred to in terms which are commonly associated with mental operations performed by a human operator, such as adding or comparing. No such capability of a human operator is necessary, or desirable in most cases, in any of the operations described herein which form part of the present invention. Rather, the operations are machine operations. Useful machines for performing the operation of the present invention include general purpose digital computers or similar devices.

Figure 14:
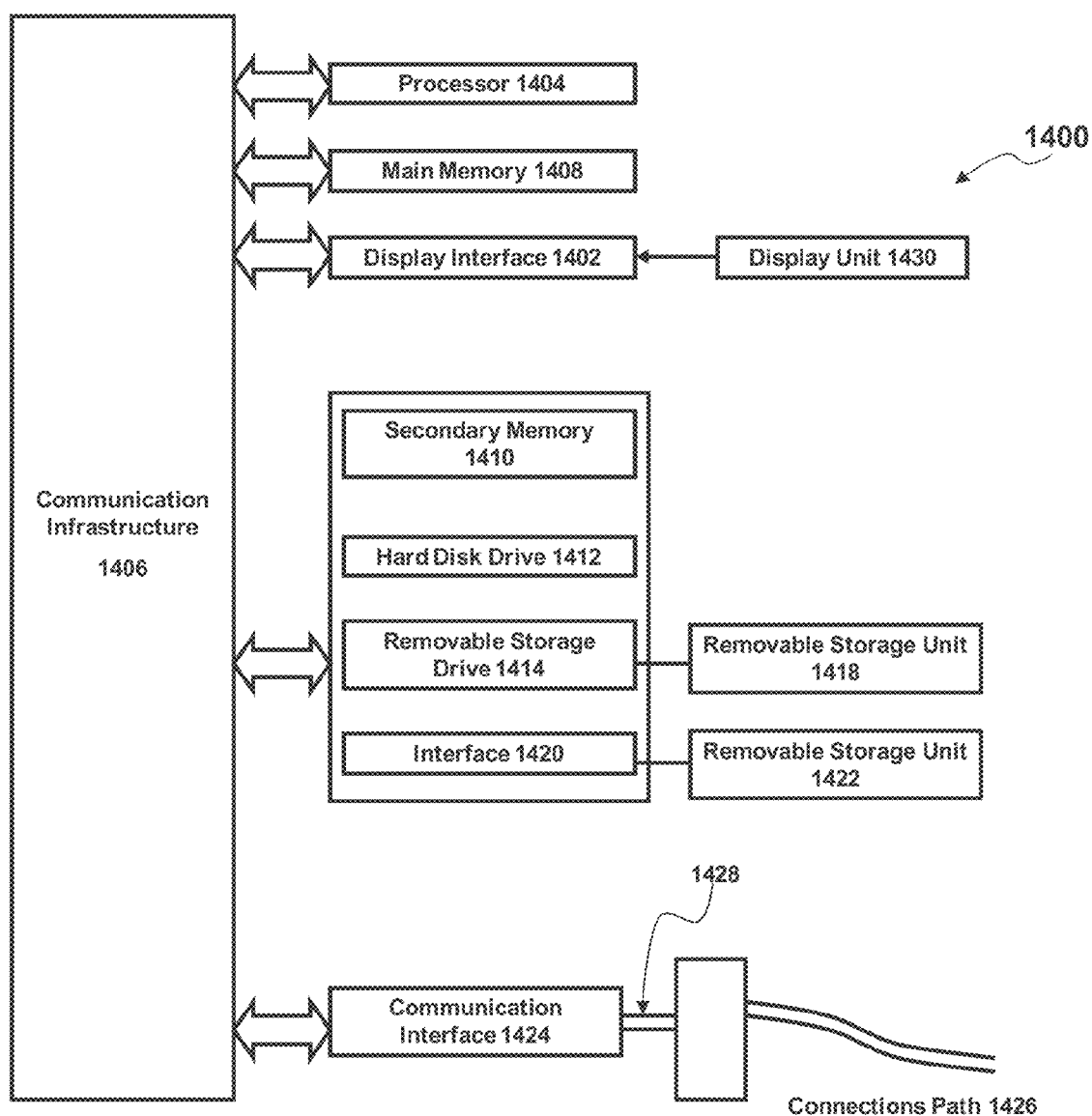
FIG. 14 is a block diagram of an exemplary computer system useful for implementing the present invention.

In fact, in one aspect, the invention is directed toward one or more computer systems capable of carrying out the functionality described herein. An example of a computer system 1400 is shown in FIG. 14.

Computer system 1400 includes one or more processors, such as processor 1404. The processor 1404 is connected to a communication infrastructure 1406 (e.g., a communications bus, cross-over bar, or network). Various software aspects are described in terms of this exemplary computer system. After reading this description, it will become apparent to a person skilled in the relevant art(s) how to implement the invention using other computer systems and/or architectures.

Computer system 1400 can include a display interface 1402 that forwards graphics, text, and other data from the communication infrastructure 1406 (or from a frame buffer not shown) for display on the display unit 1430.

Computer system 1400 also includes a main memory 1408, preferably random access memory (RAM), and may also include a secondary memory 1410. The secondary memory 1410 may include, for example, a hard disk drive 1412 and/or a removable storage drive 1414, representing a floppy disk drive, a flash drive, a magnetic tape drive, an optical disk drive, etc. The removable storage drive 1414 reads from and/or writes to a removable storage unit 1418 in a well known manner. Removable storage unit 1418 represents a floppy disk, magnetic tape, optical disk, etc. which is read by and written to by removable storage drive 1414. As will be appreciated, the removable storage unit 1418 includes a computer usable storage medium having stored therein computer software and/or data.

In alternative aspects, secondary memory 1410 may include other similar devices for allowing computer programs or other instructions to be loaded into computer system 1400. Such devices may include, for example, a removable storage unit 1422 and an interface 1420. Examples of such may include a program cartridge and cartridge interface (such as that found in video game devices), a removable memory chip (such as an erasable programmable read only memory (EPROM), or programmable read only memory (PROM)) and associated socket, and other removable storage units 1422 and interfaces 1420, which allow software and data to be transferred from the removable storage unit 1422 to computer system 1400.

Computer system 1400 may also include a communications interface 1424. Communications interface 1424 allows software and data to be transferred between computer system 1400 and external devices. Examples of communications interface 1424 may include a modem, a network interface (such as an Ethernet card), a communications port, a Personal Computer Memory Card International Association (PCMCIA) slot and card, etc. Software and data transferred via communications interface 1424 are in the form of signals 1428 which may be electronic, electromagnetic, optical or other signals capable of being received by communications interface 1424. These signals 1428 are provided to communications interface 1424 via a communications path (e.g., channel) 1426. This channel 1426 carries signals 1428 and may be implemented using wire or cable, fiber optics, a telephone line, a cellular link, a radio frequency (RF) link and other communications channels.

In this document, the terms "computer program medium" and "computer usable medium" are used to generally refer to media such as removable storage drive 1414, a hard disk installed in hard disk drive 1412, and signals 1428. These computer program products provide software to computer system 1400. The invention is directed to such computer program products.

Computer programs (also referred to as computer control logic) are stored in main memory 1408 and/or secondary memory 1410. Computer programs may also be received via communications interface 1424. Such computer programs, when executed, enable the computer system 1400 to perform the features of the present invention, as discussed herein. In particular, the computer programs, when executed, enable the processor 1404 to perform the features of the present invention. Accordingly, such computer programs represent controllers of the computer system 1400.

In an aspect where the invention is implemented using software, the software may be stored in a computer program product and loaded into computer system 1400 using removable storage drive 1414, hard drive 1412 or communications interface 1424. The control logic (software), when executed by the processor 1404, causes the processor 1404 to perform the functions of the invention as described herein.

In another aspect, the invention is implemented primarily in hardware using, for example, hardware components such as application specific integrated circuits (ASICs). Implementation of the hardware state machine so as to perform the functions described herein will be apparent to persons skilled in the relevant art(s).

In yet another aspect, the invention is implemented using a combination of both hardware and software.

Payment Tags

Tag scanner applications, also referred to as mobile payment applications, may be used to facilitate payment using a checkout tag 1602. A mobile payment application is a software application or webpage capable of being stored, executed and/or accessed on a mobile device that is used for recording tag information and/or providing payment authorization from a buyer. As used herein, the mobile payment application may be a webpage accessible from a computing device by, for example, scanning a QR code and accessing a webpage associated with a web address encrypted in the QR code.

Payment may be facilitated by a payment service provider application (e.g., mobile applications provided by a payment service provider, websites associated with such providers, or the like). In some aspects, the buyer of a good or service may select the payment service provider application from a variety of applications and/or service providers. In this manner, in some aspects, any payment type may be used via any payment service provider provided that the payment service provider is compatible with methods, systems, and/or computer program products disclosed herein. Payment types include but are not limited to credit card payments, bank transfers, cryptocurrency exchanges, redeeming of reward points, and the like.

Figure 16:
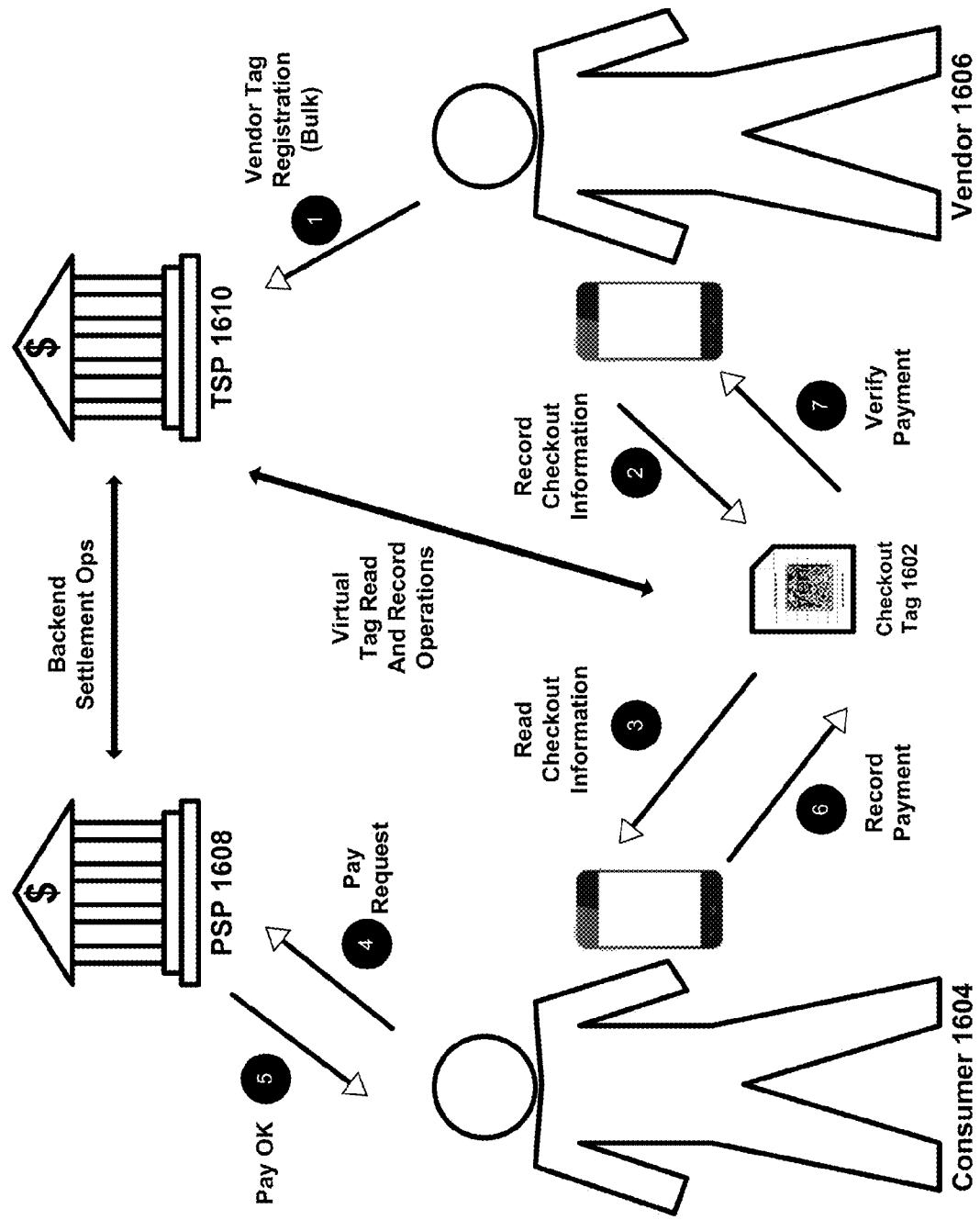
FIG. 16 is a system diagram illustrating the flow of data in an exemplary payment verification process using checkout tags, according to one aspect of the present invention.

Referring to FIG. 16, a system diagram illustrating the flow of data in an exemplary payment verification process using checkout tags 1602, according to one aspect of the present invention, is shown.

Figure 15:
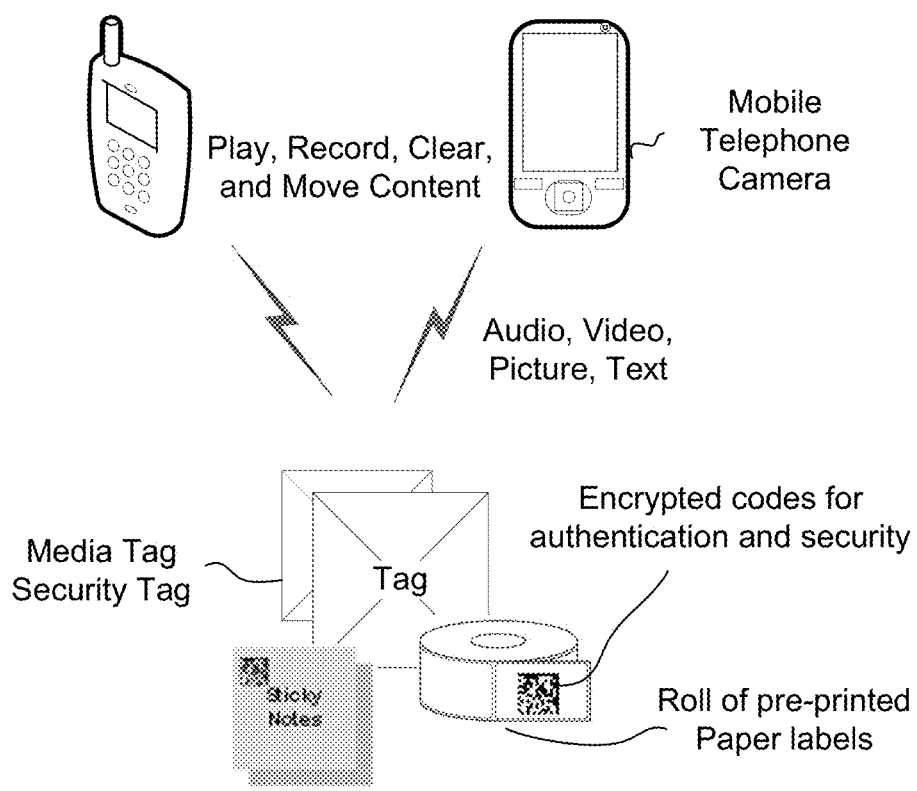
FIG. 15 is a block diagram illustrating an exemplary system for storing, securing, identifying, authenticating and retrieving of multimedia information using low-cost barcode or RFID tags according to one aspect of the present invention.

In an aspect, a unique retail checkout tag 1602 is used for each checkout transaction, as shown in FIG. 16. Each tag 1602 is typically attached (or embedded in some cases) to a product—for example a cereal box, or a service bill—for example a restaurant guest checkout bill. Tag 1602 is typically made of a low cost material, typically a printed paper or such equivalent material. Since vendors 1606 (a retail merchant is an example of a vendor) conduct hundreds or even thousands of transactions, tags 1602 are often packaged as a booklet, a roll or a cassette like mechanism as shown in FIG. 15. This allows the package to be registered by vendor 1606 in bulk to receive payments from a plurality of consumers 1604.

Each tag 1602 is associated with a plurality of identifiers in order to fulfil the transaction steps shown in FIG. 16. Tag 1602 contains one or more of the items described in Table 3, below.

| IDENTIFIER | DESCRIPTION | ENCODING FORMAT |
|---|---|---|
| Tag Number (TN) | Unique Tag identifier designed as a user friendly sequential number for tracking purpose. In some aspects, the TN is a long unique number to prevent unauthorized access. | Alpha Numeric number |
| Proof of Payment Number (PPN) | Pre-assigned pseudo-unique number typically printed on vendor portion of the tag. | Number, symbol, image |
| Recordable Tag Code (RTC) | Recordable unique tag identifier encoded as per prior patents. Used for recording checkout transactions by both vendor and consumer. | 2D barcode such as QR code, Data matrix or equivalent encoded symbol |
| Batch Recording Code (BRC) | Recordable unique booklet code. Used for recording vendor checkout data for plurality of tags covering a complete subset of bounded tags in a booklet. | 2D barcode such as QR code, Data matrix or equivalent encoded symbol |

-continued

| IDENTIFIER | DESCRIPTION | ENCODING FORMAT |
|---|---|---|
| Booklet number (BN) | Identify plurality of tags in a bounded batch, used for vendor tag registration and assigning vendor deposit account numbers. | Alpha Numeric Number |

The transaction process of FIG. 16 may be utilized to facilitate a variety of transactions including but not limited to the following examples.

In an aspect, a 24-Hour parking lot owner purchases a set of checkout tags 1602 from TSP 1610 and registers tags 1602 with financial account information. Since the 24-Hour parking lot has a fixed parking price, entire booklet of tags 1602 is recorded with a fixed price using bulk recording tag on the front of the booklet (See FIG. 17).

A parking lot attendant 1606 hands tag 1602 to each car driver 1604 as they drive-in. Driver 1604 makes payment with his compatible mobile device app and places tag 1602 on the car dashboard. Parking attendant 1606 can check payments at his convenience simply by scanning the printed barcode on the tag 1602 visible from the front glass or when the car is being checked out of the parking lot.

In another aspect, the present invention may facilitate operation of a hotel convenience store. Many hotels have convenience stores next to the lobby and are often unmanned. Many do not have appropriate point of sale systems. Each of the products offered can be labelled with a checkout label 1602 and recorded price. Customers 1604 can use their app to check the price and make the payments. Lobby personnel 1606 receive notification of payments on their PC or another registered mobile device. Lobby personnel 1606 can also optionally verify the payments simply by scanning the checked out products. Thus, this invention avoids having any expensive POS terminal and card readers for accepting electronic payments.

In another aspect, the present invention facilitates payment at a restaurant. Two consumers 1604, Ben and his wife Maggie, go to a high end restaurant to celebrate wedding anniversary. Their server 1606, Emily, makes it special for them for the evening. At the end of the special dinner, Emily takes checkout tag 1602 and records bill amount as well as a special audio message for wishing them on the occasion. Ben and Maggie scan checkout tag 1602 with Ben's mobile phone and listen to the message. Feeling very satisfied for the special gesture Ben adds substantial tip to the bill amount and makes the payment.

Emily notes down the PPN number displayed on Ben's phone and compares with vendor portion of the tag 1602 to verify payment.

The invention thus allows recording personalized service message as well as provides a mechanism to checkout using mobile device using a simple low cost tag 1602.

Figure 17:
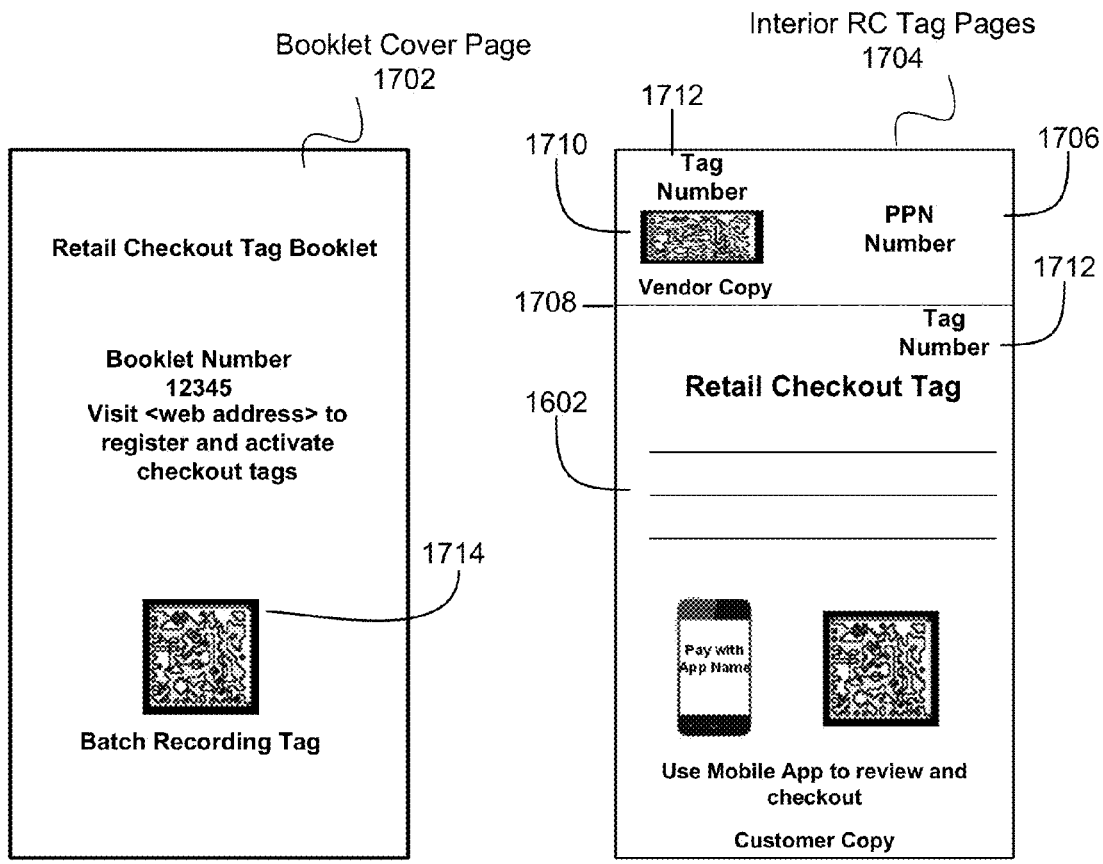
FIG. 17 is a diagram of portions of an exemplary tag booklet in accordance with an aspect of the present disclosure.

Referring to FIG. 17, a diagram of portions of an exemplary tag booklet in accordance with an aspect of the present disclosure, is shown.

A tag booklet may include a booklet cover page 1702. Each booklet includes a booklet number and a batch recording tag 1714. In some aspects, booklet cover page 1702 may further include instructions from TSP 1610 to consumer 1606 indicating how to register and utilize checkout tags contained within booklet.

The interior pages 1704 of the booklet each comprise two parts: a vendor portion 1706 and checkout tag portion 1602. Checkout tag 1602 may be removed from the booklet and vendor portion 1704 via tearing along perforated edge 1708. Both vendor portion 1706 and tag 1602 contain a printed tag number 1712. Each portion may contain instructions on how to use it, as well as machine readable codes such as a recordable tag code 1710 for assigning a price or other information to the single associated tag 1602.

Figure 18:
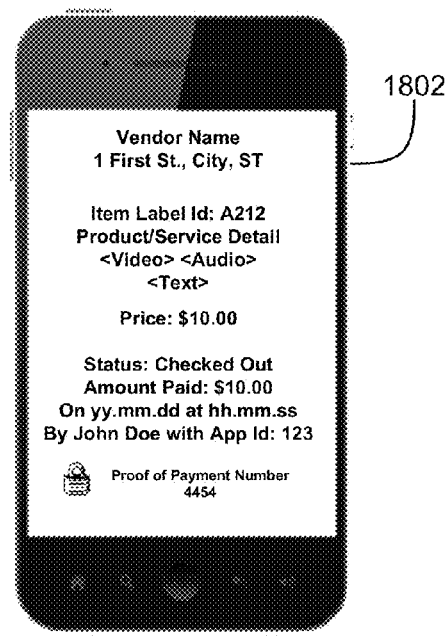
FIG. 18 is a diagram of an exemplary screen display which would be presented to a consumer upon tag checkout, according to an aspect of the present invention.

Referring to FIG. 18, a diagram of an exemplary screen display 1802 which would be presented to consumer 1604 upon tag checkout, according to an aspect of the present invention, is shown.

When tag 1602 is utilized to pay for the associated product or service, screen 1802 shows a representative information display. The information include vendor name and address, product or service description in optional multimedia format, charging (pricing) information, payment information including amount paid, proof of payment number and payee name and date/time of payment. Also shown is the app used for payment.

Figure 19:
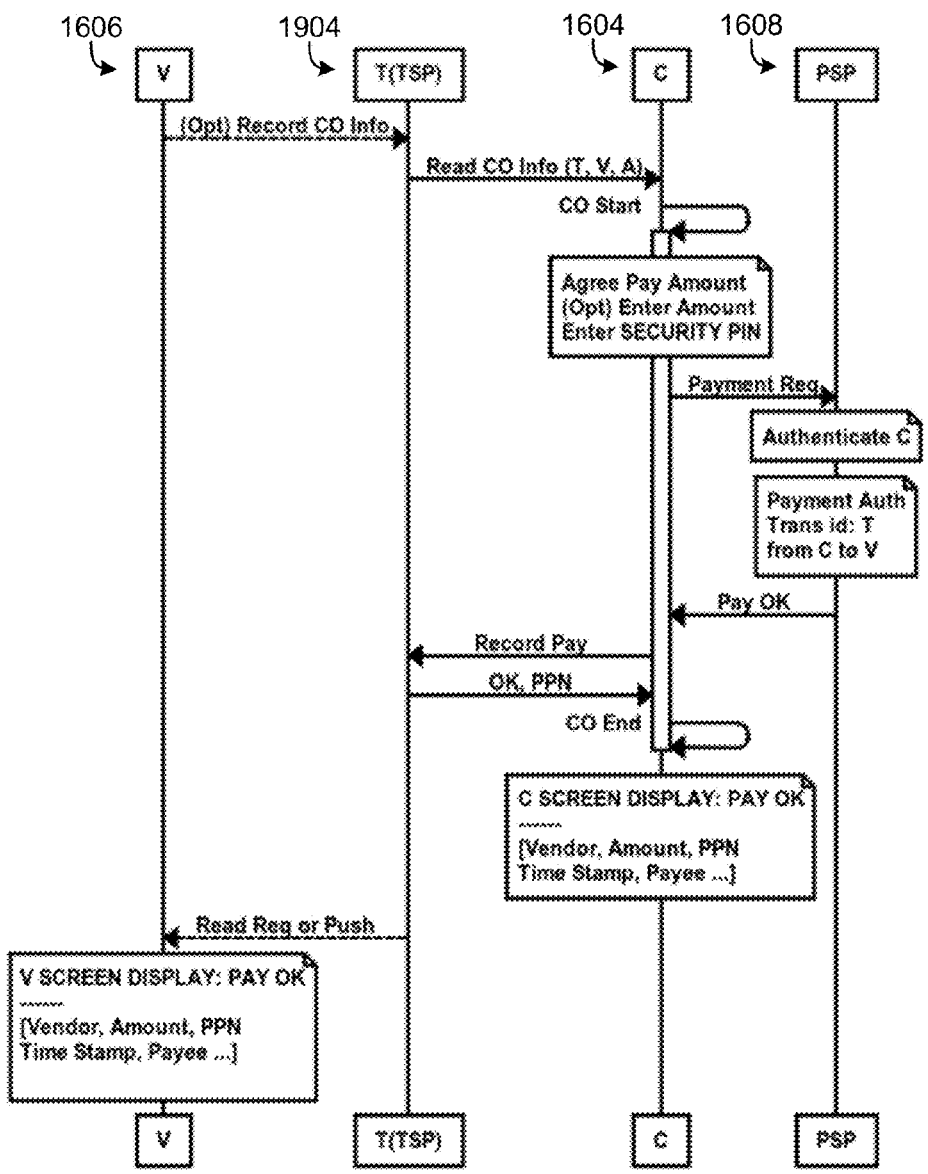
FIG. 19 is a dataflow diagram depicting data flow which facilitates payment utilizing checkout tags, according to an aspect of the present invention.

Referring to FIG. 19, a dataflow diagram depicting data flow which facilitates payment utilizing checkout tags 1602, according to an aspect of the present invention, is shown.

FIG. 19 shows an exemplary message and data flow between entities involved in facilitating payment utilizing one or more tags 1602. The flow shows vendor 1606 recording the checkout information on tag 1602 which is read by customer 1604. Customer 1604 initiates payment with PSP 1608 and upon successful completion, customer 1604 records the receipt of payment on tag 1602. Tag 1602 can then be verified with a read operation or push notification by vendor 1606. Tag 1602 data is managed by TSP 1904.

For the purpose of security and making sure that the payments using pre-printed tags 1602, tags 1602 are registered before they are used for checkout.

Vendor 1606 may provide authenticated business and financial information registered for each booklet within the Tag Service Provider database. The authenticated information includes the Vendor's legal business name, mailing address, valid bank account among other data. This can be done by the well-known industry accepted practices and are not discussed as part of this invention.

The tag service provider database serves the authenticated information to payment apps in order for the payment apps to make payments to vendor's financial accounts.

Figure 20:
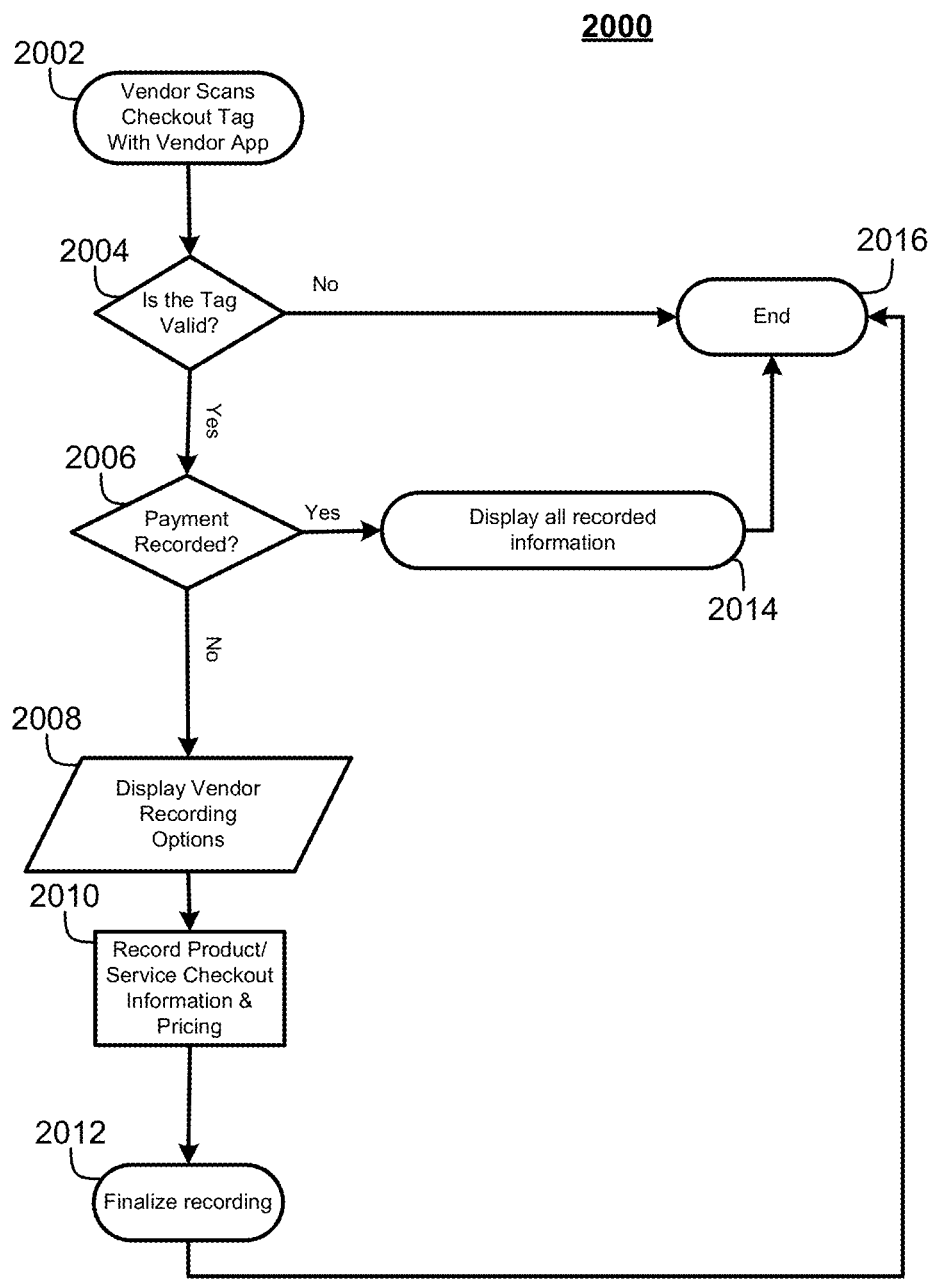
FIG. 20 is a flowchart illustrating a process for recording checkout information, according to an aspect of the present invention.

Referring to FIG. 20, a flowchart illustrating a process 2000 for recording checkout information, according to an aspect of the present invention, is shown. Portions of process 2000 may be carried out by vendor 1606, vendor agents and the like. Vendor 1606 may utilize a mobile device, kiosk, or other computing device. At step 2002, vendor 1606 scans tag 1602 via a vendor app. At analysis step 2004, the vendor app and the associated infrastructure (e.g., tag service provider systems) determine if tag 1602 is valid. If tag 1602 is not valid, process 2000 proceeds to step 2016 and terminates. If tag 1602 is valid, process 2000 proceeds to step 2006 where it is determined if an associated payment has been recorded (i.e., it is determined if the associated product or service has been purchased using tag 1602). If payment has been recorded, step 2014 executes and vendor 1606 is presented with relevant recorded information. Process 2000 then terminates at step 2016.

If a payment has not been recorded, step 2008 us carried out wherein payment and merchandising options are presented to vendor 1606. At step 2010, vendor 1606 supplies product or service checkout information and pricing which is stored in, for example, a tag service provider database. The information may be confirmed at step 2012 and then process 2000 terminates at step 2016. In some aspects, no further changes are allow to tag 1602 after process 2000 is utilized to record information from vendor 1606.

Vendors 1606 can record structured or unstructured information to retail checkout tags 1602 which can be played or viewed by consumers 1604 during the checkout process. The information may include audio or video of the product or service offered, a custom message, pricing of the product offered or any other pertinent information depending upon the implementation. Further, the price recording may include plurality of information including amount, tax options including tax information, exact or minimum payment options for offering flexibility in making payment, and the like. For example, a restaurant may select a minimum payment option to allow consumer to include an additional tip amount.

The checkout tag recording by vendor 1606 is done either using bulk recording tag 1714 on the booklet, or on individual tags 1602 simply by scanning the tag code and selecting appropriate recording fields.

Once recorded, the information can be viewed or played by any equipped app without authentication credentials. The recording can never be erased making tag 1602 serve as a receipt once paid and checked out by consumer 1604.

Figure 21:
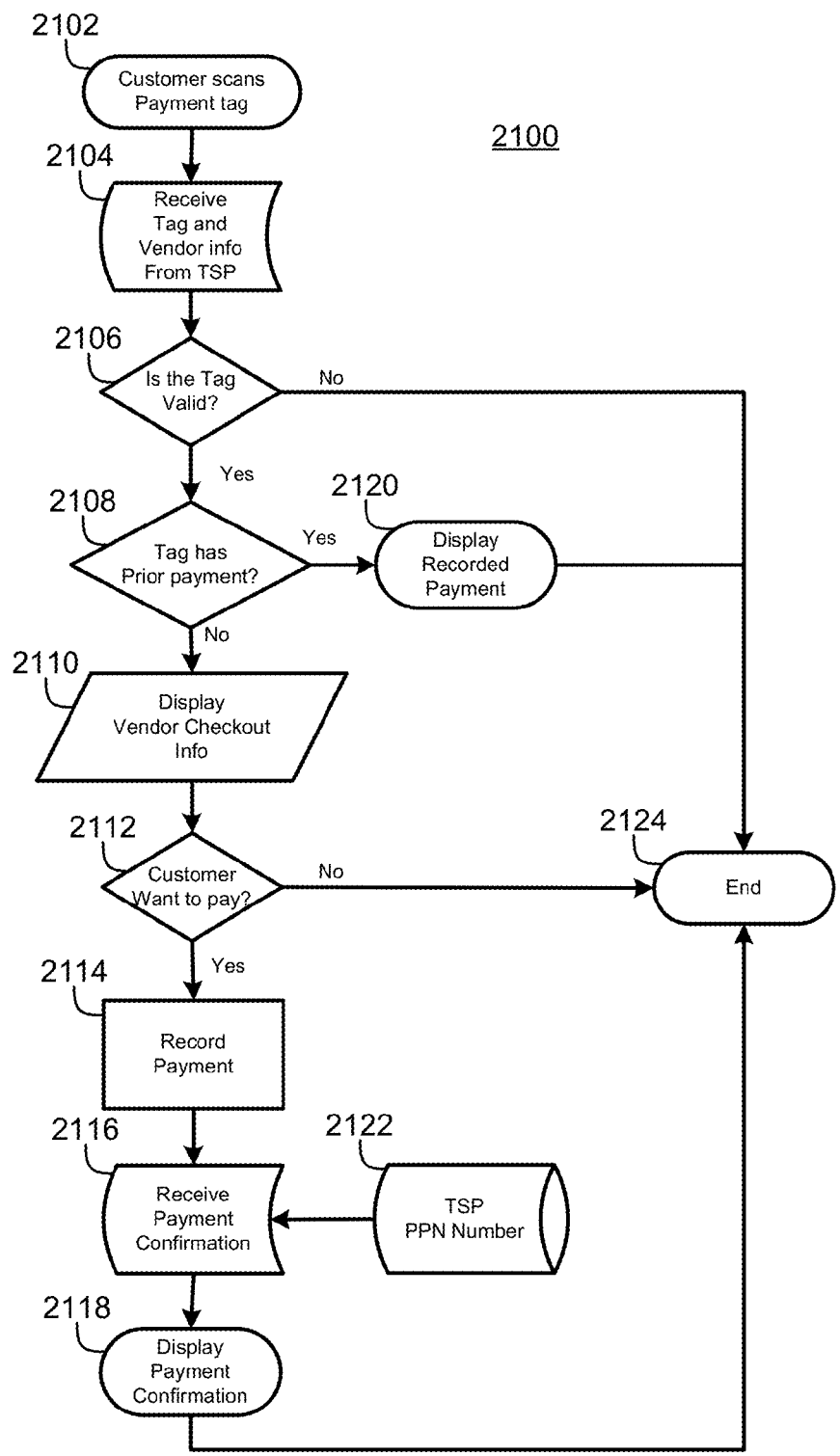
FIG. 21 is a flowchart illustrating a process for reading checkout information and recording payment using tags, according to an aspect of the present invention.

Referring to FIG. 21, a flowchart illustrating a process 2100 for reading checkout information and recording payment using tags 1602, according to an aspect of the present invention, is shown. The customer experience is shown. Process 2100 begins at step 2102 where customer 1604 scans tag 1602. The customer mobile device then receives tag and vendor information from the TSP at step 2104. At step 2106 a validity check is performed. If tag 1602 is not valid, process 2100 terminates at step 2124. If tag 1602 is valid, a prior payment check is performed at step 2108. If a prior payment has been made, step 2120 executes. Mobile device displays proof of the prior payment. Process 2100 then proceeds to step 2124 and terminates.

If no prior payment has been made step 2110 executes and customer 1604 is presented with vendor checkout information. At step 2112, customer decides if he wishes to pay. If customer 1604 does not wish to pay, process 2100 executes step 2124 and terminates. If customer 1604 does wish to pay, customer 2114 provides payment details which are recorded at step 2114. The information is sent and customer 1604 receives a payment confirmation, such as a TSP PPN number at step 2116. This payment confirmation is displayed to customer 1604 at step 2118. Process 2100 then terminates at step 2124.

In an aspect, as part of the sales process, vendor 1606 presents checkout tag 1602 to consumer 1604. The checkout tag can be a stand-alone tag or it may be attached to a product. Consumer opens their app and scans the tag. All prior recorded information is displayed with an option to pay, record payment detail and checkout associated product or service.

Recording payment triggers a backend process within payment service provider (PSP) where the PSP works with TSP databases to complete the payment process. Payment process by PSP requires the following minimum information:

In an aspect, the payer identity has been previously authenticated. The mobile app for consumer wallet is provided by the PSP and therefore the app supplies the basic authentication information. In another aspect, consumer provides a secure PIN code, thereby authorizing the payment from the designated mobile wallet.

In an aspect, a proof of payment number (PPN) from TSP tag database is obtained as associated with checkout tag 1602. The PPN number is pre-generated during the tag manufacturing process and is stored in TSP database for each checkout tag. The PPN number is also printed on the vendor portion of the checkout tag. The recording of the PPN number on the checkout tag payment record is done automatically by the TSP once consumer requests recording the payment confirmation received from PSP. The PPN number is also returned to the consumer mobile App after payment recording.

Once recorded, the payment confirmation is permanently stored on the checkout tag which can be verified simply by scanning the tag again by an equipped App.

Vendor 1606 may verify payment utilizing ways such as the following ways First, vendor 1606 can visually inspect the PPN number displayed on the consumer's mobile phone and compare with a pre-printed PPN number on a vendor's portion of the tag. A match indicates payment made as TSP reveals the PPN number only upon payment recording. Next, vendor 1606 may receive a text message on their a pre-registered device as soon as a payment is made. Payment may also be registered, checked and/or confirmed by scanning the paid checkout tag (such as the vendor portion of checkout tag) with an app and verify the payment.

In various aspects, some or all of the following information is displayed on the proof of payment page: vendor name; vendor address; vendor checkout recording information; consumer checkout status (e.g., paid, not paid); amount of payment made, if any; PPN; the identity of the payment app; a payment provider reference number; and date and time of payment.

Referring to FIG. 22, a flowchart illustrating a process 2200 for payment service provider 1608 to facilitate checkout utilizing checkout tags 1602, according to an aspect of the present invention, is shown. Process 2200 begins at step 2202 with a payment request being received by PSP 1608. When a payment request is received, step 2204 executes and PSP 1608 authenticates the customer with stored information 2214. If customer 1604 is authenticated in step 2206, step 2208 executes wherein PSP 1608 receives vendor account detail 2216. PSP 1608 then processes payment at step 2210 and at step 2212, confirmation is sent to customer 1604.

Referring to FIG. 23, a flowchart illustrating a process 2300 for tag service provider 1610 to facilitate a payment by performing a tag check, according to an aspect of the present invention, is shown. Process 2300 begins at step 2302 where TSP 1610 receives a tag check request. TSP 1610 maintains a tag database. At determining step 2304, TSP 1610 checks the received information against the tag database. If the tag is not found, step 2310 executes and an invalid tag message is returned. If the tag is found step 2306 executes. At step 2306, TSP 1610 determines if the relevant tag has been checked out or otherwise used to facilitate a payment. If tag 1602 has been used, step 2312 executes and a payment record is returned. If tag 1602 has not been used, recorded information may be returned in step 2308, such as checkout information from vendor 1606 or payment information from customer 1604.

Referring to FIG. 24, a flowchart illustrating a process 2400 for facilitating tag recording from the customer viewpoint, according to an aspect of the present invention, is shown. Once customer makes a payment with PSP 1608 and requests TSP 1610 to record the payment receipt at step 2402, TSP 1610 records the payment information to the checkout tag at step 2404 and returns a pre-stored proof of payment number at step 2406. This process completes the checkout process.

Figure 25:
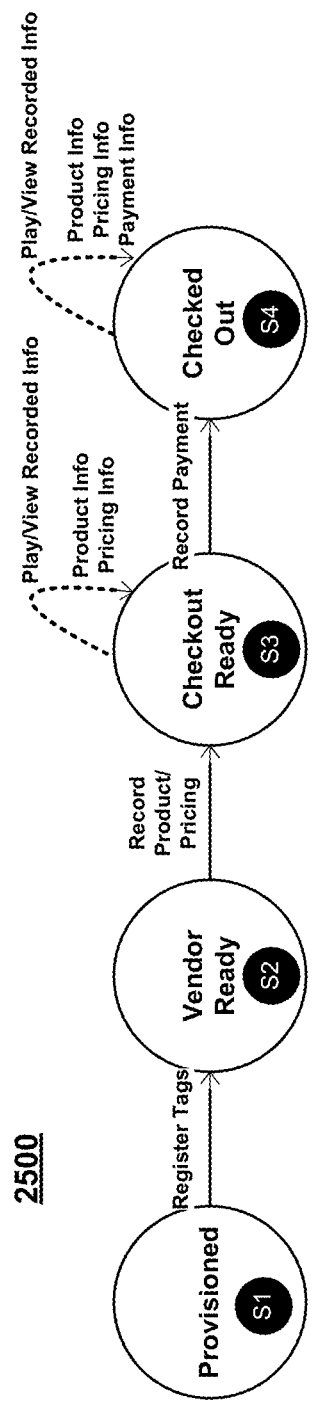
FIG. 25 depicts a representative state transition diagram for checkout tag maintained at the tag Service Provider database, according to an aspect of the present invention.

Referring to FIG. 25, a representative state transition diagram 2500 for checkout tag 1602 maintained at the tag service provider database, according to an aspect of the present invention, is shown. Checkout tag 1602 allows only certain actions on tag 1602 depending upon the state it is in. FIG. 25 shows four state transitions and the actions performed.

State S1 is the initial state which is attained when tag 1602 is manufactured and provisioned. In this state the only operation allowed is to register the tag 1602 by vendor 1606 who intends to use checkout tags 1602.

State S2 is entered when vendor 1606 obtains tags 1602 and registers them with vendor's financial account information to receive payments. In this state, tag 1602 allows recording operation for checkout information from vendor 1606.

State S3 is entered when vendor 1606 records checkout information which includes product or service description and pricing. In this state tag 1602 allows recording payments by customer 1604 or viewing the recorded information.

State S4 is entered when customer 1604 records payment information. This is the final state of checkout tag 1602 and in this state tag 1602 acts as a proof of payment and no further recording is allowed. In this state tag 1602 allows viewing recorded checkout and payment information.

In another aspect, it is not necessary for vendor 1606 to record checkout or pricing information on tags 1602. In certain situations such as donations, customers 1604 can simply enter the amount of payment as part of the checkout process. This eliminates vendor need to carry any electronic equipment.

Many small vendors 1606 may physically write a bill with pricing information and attached checkout tag 1602 may be used only by consumer 1604 to make the payment. In this case, consumer 1604 enters the price information on mobile app as written by vendor 1606.

In some aspects, there is more than one vendor recordable field. For example, if tag 1602 is used as an admission ticket to an event, vendor 1606 can record the admitted state to cancel the ticket when consumer 1604 is admitted to the event. By extension, therefore, the invention allows for unlimited recording and logging of MIME data on low cost recordable tags 1602 depending upon the application and usage.

CONCLUSION

While various aspects of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above described exemplary aspects, but should be defined only in accordance with the following claims and their equivalents.

In addition, it should be understood that the figures in the attachments, which highlight the structure, methodology, functionality and advantages of the present invention, are presented for example purposes only. The present invention is sufficiently flexible and configurable such that it may be implemented in ways other than that shown in the accompanying figures.

Further, the purpose of the foregoing Abstract is to enable the U.S. Patent and Trademark Office and the public generally, and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present invention in any way.

What is claimed is:

1. A method of creating a plurality of low-cost tags for facilitating payment between a buyer and a seller utilizing a low-cost tag, the method comprising the steps of:
   (a) providing a booklet, the booklet comprising a booklet number and the plurality of low-cost tags, each of the plurality of low-cost tags comprising a tag number, a proof of payment number and a recordable tag code;
   (b) receiving, at a tag service provider database, the booklet number;
   (c) receiving, at the tag service provider database, seller deposit account information; and
   (d) associating each of the plurality of low-cost tags with the received seller deposit account information and seller registration information.

2. The method of claim 1, further comprising the steps of:
   (e) receiving, at the tag service provider database, a batch recording code;
   (f) receiving, at the tag service provider database, pricing information, the pricing information comprising product information and a price for goods or services associated with each of the plurality of low-cost tags; and
   (g) associating each of the plurality of low-cost tags with the received pricing information.

3. The method of claim 1, further comprising the steps of:
   (e) receiving, at the tag service provider database, a recordable tag code for one of the plurality of low-cost tags;
   (f) receiving, at the tag service provider database, pricing information, the pricing information comprising product information and a price for a good or service to be associated with the low-cost tag having the received recordable tag code; and
   (g) associating the one of the plurality of low-cost tags having the received recordable tag code with the received pricing information.

4. The method of claim 1, wherein the booklet is a roll of low-cost tags.

5. The method of claim 1, wherein the at least one of: a batch recording code; the booklet number; the tag number; the proof of payment number; and the recordable tag code is capable of being read using a sensor enabled mobile device.

6. The method of claim 5, wherein at least one of: the batch recording code; the booklet number; the tag number; the proof of payment number; and the recordable tag code is one of: an RFID inlay; a 1D barcode; a Data Matrix 2D barcode; a MaxiCode 2D barcode; and a QR Code 2D barcode.

7. The method of claim 1, wherein seller registration information comprises:
   a seller business name;
   a seller financial account information; and
   a seller mailing address.

8. The method of claim 1, wherein each of the plurality of low-cost tags further comprises a seller portion and a consumer portion.

9. The method of claim 8, wherein the seller portion comprises a printed proof of payment number, the printed proof of payment number corresponding to the proof of payment number.

10. The method of claim 1, wherein the tag number, the proof of payment number and the recordable tag code are printed on the associated low-cost tag.

\* \* \* \* \*